US012739177B2

(12) United States Patent
Poteat et al.

(10) Patent No.: US 12,739,177 B2
(45) **Date of Patent: *Sep. 15, 2026**

(54) METHODS AND APPARATUS FOR SUPPORTING DYNAMIC NETWORK SCALING BASED ON LEARNED PATTERNS AND SENSED DATA

(71) Applicant: Charter Communications Operating, LLC, St. Louis, MO (US)

(72) Inventors: Stephen Poteat, Castle Rock, CO (US); Justin Hattaway, Littleton, CO (US); Sami Makinen, Littleton, CO (US); Yassine Maalej, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/787,997

(22) Filed: Jul. 29, 2024

(65) Prior Publication Data

US 2024/0388509 A1 Nov. 21, 2024

Related U.S. Application Data

(63) Continuation of application No. 18/222,637, filed on Jul. 17, 2023, now Pat. No. 12,052,147, which is a (Continued)

(51) Int. Cl.
*H04L 41/16* (2022.01)
*H04L 41/5022* (2022.01)

(Continued)

(52) U.S. Cl.
CPC .......... *H04L 41/16* (2013.01); *H04L 41/5022* (2013.01); *H04L 47/783* (2013.01); *H04L 47/788* (2013.01); *H04L 47/83* (2022.05)

(58) Field of Classification Search
CPC ........... H04L 12/66; H04L 2012/40215; H04L 2012/40273; H04L 41/082; H04L 41/0843;

(Continued)

(56) References Cited

U.S. PATENT DOCUMENTS 11,924,118 B2 * 3/2024 Kalra ...................... H04L 47/83
2022/0060911 A1 * 2/2022 Bhorkar .................. H04L 47/70

* cited by examiner

*Primary Examiner* — Djenane M Bayard
(74) *Attorney, Agent, or Firm* — Straub & Straub; Michael P. Straub; Stephen T. Straub

(57) ABSTRACT

Methods and apparatus for predicting communications resources which will be needed at a venue and then controlling the amount of available resources dynamically are described. In various embodiments real time or near real time video of areas of the venue are used to predict the number of people in a portion of a venue and/or the direction of movement. Along with other information such as the type of event and/or event schedule collected information is supplied to a set of trained resource requirement models which are used to predict future resource needs at a venue, e.g., while an event is ongoing. Commands are sent to dynamically vary the amount of communications resources provided to one or more portions of the venue. Resources which can be varied included but are not limited to fixed wired WAN bandwidth, WiFi bandwidth, cellular bandwidth, network based on-demand services, transcoding services, firewall services, etc.

20 Claims, 17 Drawing Sheets

Related U.S. Application Data continuation of application No. 17/098,375, filed on Nov. 14, 2020, now Pat. No. 11,706,100.

(60) Provisional application No. 62/936,175, filed on Nov. 15, 2019.

(51) Int. Cl.

| | |
|---|---|
| ***H04L 47/78*** | (2022.01) |
| ***H04L 47/783*** | (2022.01) |
| ***H04L 47/83*** | (2022.01) |

(58) Field of Classification Search

CPC . H04L 41/0894; H04L 41/28; H04L 43/0876; H04L 47/20; H04L 61/3025; H04L 61/4511; H04L 63/0236; H04L 67/10; H04L 67/12; H04L 67/535; H04L 67/306; H04L 63/08; H04L 2463/101; H04L 47/6215; H04L 63/061; H04L 65/764; H04L 67/06; H04L 12/1895; H04L 67/1095; H04L 67/131; H04L 12/6418; H04L 41/0809; H04L 51/52; H04L 63/0281; H04L 63/04; H04L 65/1069; H04L 65/401; H04L 65/65; H04L 65/762; H04L 67/104; H04L 43/16; H04L 67/52; H04L 12/1859; H04L 41/16; H04L 41/5022; H04L 47/783; H04L 47/788; H04L 65/1066

See application file for complete search history.

METHODS AND APPARATUS FOR SUPPORTING DYNAMIC NETWORK SCALING BASED ON LEARNED PATTERNS AND SENSED DATA

RELATED APPLICATIONS

The present application is a continuation of U.S. patent application Ser. No. 18/222,637 filed Jul. 17, 2023, which published as US 2023-0370339 A1 on Nov. 16, 2023, and of U.S. patent application Ser. No. 17/098,375 filed Nov. 14, 2020, which published as US 2021-0152435 A1 on May 20, 2021 and which issued as U.S. Pat. No. 11,706,100, and claims the benefit of U.S. Provisional Patent Application Ser. No. 62/936,175 titled "METHODS AND APPARATUS FOR INTELLIGENT NETWORK SCALING" which was filed on Nov. 15, 2019 with each of the listed patents, patent applications and patent publications being hereby expressly incorporated by reference in their entirety.

FIELD

The present application relates to network managements and, more particularly, to controlling of network capacity and communications priorities based on learned patterns and sensed data, e.g., network data and/or sensed environmental information which can be used in predicting upcoming network needs or requirements.

BACKGROUND

The use of communications devices in areas where people concentrate for particular events and/or at particular times of day can result in varying communications loads. A venue operator, e.g., a sports stadium operator, may install WiFi base stations and/or cellular base stations at a communications site. Various cellular operators may, and sometimes do, have base stations providing coverage to the area in which a venue is located.

While a venue operator may support or contract for a minimum level of coverage at the venue at all times, during particular events and/or times e.g., preceding and/or following an event, the demand for communications services may vary dramatically at different locations within the event venue. Furthermore, depending on the type of event, the types of data and/or communications services being used can vary dramatically. For example, during a concert goes may seek to capture and transmit video and audio clips while the event is ongoing while fans at a baseball game may instead send out text messages or tweets during particular portions of the event as opposed to large amounts of video/audio data.

While communications needs of visitors to a venue, e.g., fans during the event, should be taken into consideration, e.g., to promote positive comments and media streams to promote interest in the event or future events, communications needs relating to visitors before and after an event should also be taken into consideration when providing or planning for communications services at a venue.

For example, before and/or after a sporting event such as a football game, fans may hang out in a parking lot to discuss the event and/or barbeque. During such a period of time, the fans may seek to download video and/or information while in the parking area. Similarly after an event, or shortly before the end of the event there may be a large number of calls and/or text messages being sent to arrange transport and/or so that fans can arrange to meet up after the event.

Accordingly it should be appreciated that the amount of communications data and/or the type of data to be communicated can vary widely at different points in time at a venue and that the type of communications can depend on the type of event, the duration and/or time of particular portions of the event and/or other factors.

From a venue operator's perspective, it can be costly for the venue operator to provision a venue to support maximum worst case possible communications loads at all time. However, failure to provide adequate and highly desirable communications services to visitors can result in an adverse impact on a venue's reputation and/or the success of events at the location.

In view of the above it should be appreciated that there is a need for methods and/or apparatus which would allow the amount of communications services at a venue to be dynamically varied preferably without the venue operator having to provide or deploy all of the communications equipment used to provide visitors at a venue with communications services. In at least some embodiments it would be desirable if a venue operator could dynamically scale up or down the amount of communications services in real or near real time based on actual detected conditions or sensed information and/or based on the particular event or type of event that is scheduled to occur or is ongoing at the venue.

SUMMARY

Methods and apparatus for dynamically, and in some but not necessarily all embodiments autonomously, scaling communications capacity based on actual and/or predicted communications needs are described. In various embodiments artificial intelligence, in the form of trained models, is used to predict communications needs and/or detect anomalies in communications networks. The predictive system uses not only messaged network related inputs but various other inputs in predicting communications services that will be required and/or desired.

In various embodiments, sensors in the environment, e.g., video cameras and/or other monitoring devices are used to provide input used to determine e.g., estimate, the number of people in an area at a given time. In some embodiments video or sensor input, in combination with existing network load and performance characteristics, is used to determine, e.g., using artificial intelligence (AI) techniques, what is normal/steady-state and to detect and predict anomalies or changes from the normal state. The number of people in a given location, in some embodiments, is then used in some embodiments as an input to predict the current and/or future communications needs in one or more areas, e.g., portions, of a venue such as a parking areas, seating areas, meeting areas, etc. which may be the location where the number of people were estimated or near the location. For example estimates of the number of people in a parking area before an event begins based on the number of cars, trucks and/or buses in captured images can be, and sometimes is, used to predict the number of people who are or will be present inside a stadium. Similarly changes in the number of vehicles can be used to predict the number of people entering or leaving the venue.

In some embodiments, event schedule information, e.g., duration of the event and/or different portions of an event, are also used as inputs in predicting communications needs. The type of event to which sensed information and/or schedule information corresponds is also taken into consideration in some embodiments. For example, whether the event is a football game, baseball game, concert, etc. is taken into consideration in some but not necessarily all embodiments.

To facilitate a successful event, the venue operator or individual hosting the event can provide priority information to the network management system of the present invention. Such information can result in different types of traffic being prioritized differently depending on the event. For example during a concert audio/video traffic may be given increased priority over other network traffic while during a baseball game text and/or other data traffic which would normally be treated as best effort traffic may be, and sometimes are, treated as priority traffic to facilitate the sending of text message and social comments during the sporting event.

A network management system implemented in accordance with the invention can be implemented as a cloud based service with data being communicated to one or more system elements and control information being generated and sent to network devices to control the network dynamically to increase and/or decreases the communications services being provided and/or the priority given to particular types of network traffic.

While the network management system is implemented in some embodiments as a cloud based approach to network management, the network management could be, and sometimes is, implemented using a single network controller or server. In various embodiments one or more processors receive sensed data, network traffic information, information about an event or events that are scheduled at venue and use the information to predict, e.g., in real time or near real time while an event is ongoing, communication needs for one or more portions of the venue. In some embodiments the predictions are based on models of communications needs which were generated using Artificial Intelligence (AI) and/or deep learning techniques. The communications load prediction models are trained in some embodiments based on data and information from past events at a venue to which the predictive model is to be applied and, in some cases, the models are updated as new data and information is received from the venue for which the model was generated.

By using trained models to predict future communications needs, with the input to the system on real time sensor and network data inputs, useful predictions of communications needs can be made in real or near real time while an event is ongoing based on past experiences without a human operator having to set or provision a fixed amount of communications capacity for the full duration of an event. Using the predictions, the network management system can send commands to one or more network systems and/or third party providers to vary the amount of communications capacity provided to a particular service area or the priority of data traffic in an area based on the actual detected traffic and/or predictions.

In various embodiments communications capacity is affected not only by over the air data link capacity but by the capacity of network components to provide services such as firewall services, transcoding of video and/or audio services, etc. Such services may be, and sometimes are, contracted and/or supplied to a venue as cloud based services with the venue operator being able to dynamically request and contract for more or less services on relatively short notice with one or more cloud service providers responding to such service requests by allocating or reducing the number of network devices allocated to providing such communications services.

In at least some embodiments the network management system of the invention varies the amount of one or more communication related network services dynamically based on the predicted communications needs. In some embodiments the control of the amount of communications related network services is changed automatically, e.g., autonomously in real time or near real time, e.g., on a hourly or shorter time basis in some cases. Thus while over the air bandwidth may be varied by contracting with an over the air service provider such as a cellular or WiFi provider to provide increased capacity in some embodiments the communications capacity which is varied is or includes features relating to processing or enabling the communications of data such as firewall and/or transcoding services which may be, and sometimes are, provided by elements in a communications network core and/or by a cloud based service provider.

An exemplary method of operating a management system in a communications network to manage communications services corresponding to a first venue, in accordance with some embodiments, comprises: receiving input information indicating, for the first venue, at least two of: event type information, event schedule information, parking lot vehicle occupancy information, parking lot vehicle occupancy change information, information on the number of people in an area, information on the direction of movement in people in an area, wireless device presence information; determining, based on the received input information and one or more trained communications resource requirement models, predicted communications resources predicted to be needed for the first venue for a first time interval; and sending a command to one or more network devices to alter the communications resources provided to the first the first venue based on the predicted communicates resources needed for the first time interval.

While various features discussed in the summary are used in some embodiments it should be appreciated that not all features are required or necessary for all embodiments and the mention of features in the summary should in no way be interpreted as implying that the feature is necessary or critical for all embodiments.

Numerous variations on the above described methods and apparatus are described in the detailed description which follows.

DETAILED DESCRIPTION

Figure 1:
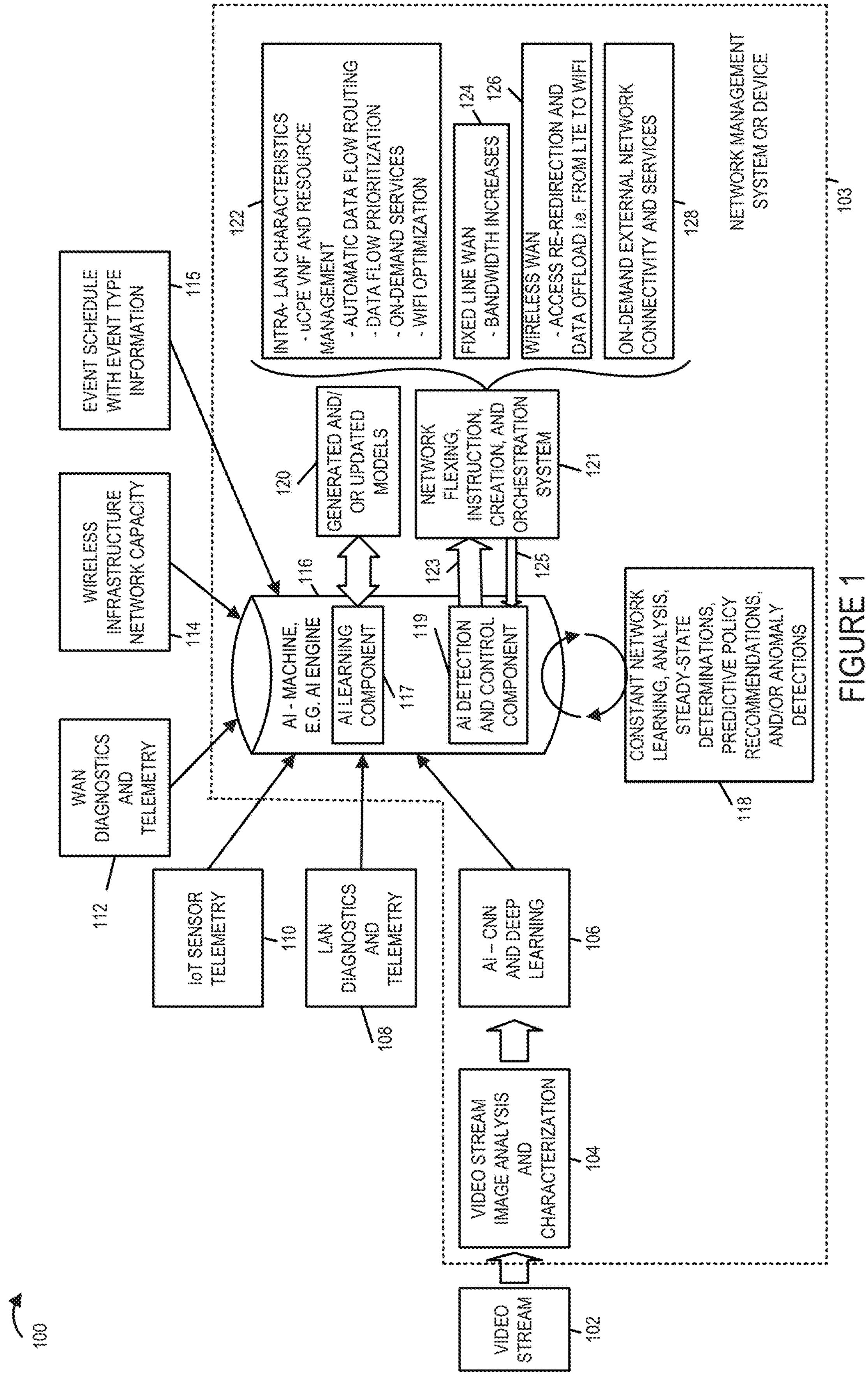
FIG. 1 is a drawing illustrating a high level logic flow in accordance with an exemplary embodiment.

Various embodiments are directed method and apparatus for intelligent, intent-based network scaling which allow for predictions of the amount and type of resources that will be needed at one or more venues to be predicted on the fly based on sensed data and/or other information. In some embodiments the type of event which is to occur at a venue and/or the event schedule is taken into consideration when predicting resources that will be required at a venue. The resources which are made available at an individual venue are dynamically requested and changed as the predicted resource needs change.

In various embodiments utilization of resources at one or more venues are monitored along with various sensor feeds, e.g., camera feeds. Resource requirement prediction models for various resources are generated in some embodiments on a per venue basis based on the actual utilized resources detected as being used during one or more training information collection periods. For a set of given sensed information a model is trained to predict the resources that will be used in a subsequent time period. Resource utilization predictions as implemented as an artificial intelligence pattern matching problem.

During use trained resource prediction models are supplied sensed information, e.g., information about the number and type of vehicles in a parking area at a venue along with event type information. Based on the input information and the use of trained resource prediction models corresponding to a venue, resources which are expected to be needed at the venue are predicted. Commands are then sent to adjust the communications resources provided to a venue based on the predictions.

Some embodiments support the use of Internet-of-Things (IoT) Services with the amount of services which are provided to a venue being dynamically varied based on the prediction of the amount of services which are expected to be needed.

The digital transformation driving industry and society has created the need for networks and services to intelligently and autonomously adapt and scale to accommodate dynamic environments in a manner that is cost-effective and delivers a simplified customer experience.

Analysis of a real-time video feed is used, in some embodiments, to determine the normal network state and used for anomaly detection which will result in automatic, autonomous real-time network changes. Additionally, in some exemplary embodiments, methods and/or apparatus will leverage IoT sensor technologies to monitor traffic at a private venue, and cause the network to flex and adjust for increased and changing network needs. Key network components are modified, in accordance with a feature of some embodiments, to accommodate expected changes, e.g., increases, in social media, local services and application-based traffic for attendees, as well as changes, e.g., increases, in network demands on venue network infrastructure.

Various exemplary embodiments, implemented in accordance with one or more features of the present invention, include capabilities that create and facilitate a flexible network that addresses connectivity needs of attendees at a densely populated venue. This network flexibility will enable users to seamlessly operate mobile devices, by automatically scaling the wired and wireless, including cellular infrastructure to accommodate the increased demand for applications, video and services at kiosks, booths, and very important person (VIP) suites throughout the venue.

Exemplary methods and embodiments, in accordance with the present invention, provide a solution which centers on a video analytics and a sensor-based IoT environment feeding analytic engine(s) that autonomously drive intelligent, predictive and adaptive decisions on network performance and services. Artificial Intelligence (AI) and deep learning are used to analyze a video monitoring stream to characterize service flows, WiFi and cell tower backhaul capacity. As needs diminish, the network scales down. In addition, universal customer premise equipment (uCPE) are used to process environmental IoT sensor data and to provide additional virtualized services, e.g., to venue VIP suites.

An exemplary intelligent network, including features of the present invention, is enabled that requires minimal human intervention and which dynamically flexes to facilitate a cost-effective, exceptional and safe experience for those in attendance at the event venue.

Various features and/or aspects of some embodiments of the present invention are further described below.

Artificial Intelligence (AI) and Deep Learning are used. In some embodiments, real-time video of a parking lot is analyzed using AI and Deep Learning to characterize vehicle types, vehicle counts and occupied parking spots. This data is input into a network analytics engine as described below.

Intent-Based Machine Learning and Network Analysis are used. AI and Machine Learning (ML) are used to analyze and correlate network telemetry, parking lot video analysis data and IoT sensor data to intelligently and predictively make recommendations to optimize the network infrastructure. AI and ML are used to continuously analyze traffic and data trends to improve network flexing.

IoT sensor data processing and aggregation is used. Venue environmental and security sensor data alerts are used as input to the network analytics platform.

Universal Customer Premise Equipment (uCPE) is leveraged to provide multiple services at the edge. A virtual Software Defined-Wide Area Network (SD-WAN) network is, in some embodiments, provided. A virtual firewall is, in some embodiments, provided. A virtual session border controller is, in some embodiments, provided.

On-demand expanded services, e.g., via 3rd party cloud providers, are offered. This is a network flexing component of scaling the network.

A lean Network Functions Virtualization (NFV) is, in some embodiments, used to manage services and virtual function on the uCPE.

MEF standards and Lifecycle Service Orchestration (LSO) Application Programming Interfaces (APIs) are used in some embodiments. For example, MEF 3.0 Lifecycle Service Orchestration application programming interfaces (LSO APIs) are, in some embodiments, used to make bandwidth changes to the wide area network (WAN) input as well to make bandwidth changes within the local area network (LAN). In addition to bandwidth changes, network attributes such as prioritization of traffic flows are changed, e.g. optimized, across a service and network infrastructure, e.g. a MEF 70-compliant SD-WAN service and the overall network infrastructure.

FIG. 1 is a drawing 100 illustrating a high level logic flow in accordance with an exemplary embodiment. One or more captured video streams 102, e.g., from video cameras at a venue, e.g. capturing images of parking lots, entrance and exit areas, and areas within an arena, stadium racetrack, building or event activity space, are subjected to video stream image analysis and characterization in step 104, e.g., determining counts for number of vehicles of different types (cars, vans, busses, etc.) in different areas (different parking lot areas), counts of numbers of people in different areas (different parking lot area, near entrances, near exits, within stadium, etc), counts for number of vehicles entering and/or leaving, and/or counts for number of people entering and/or leaving. The results of the video stream image analysis and characterization are input to an Artificial Intelligence-Convolutional Neural Network (AI-CNN) and deep learning device, program or function 106, which processes the received information. AI-machine 116, e.g., an AI engine, includes an AI learning component 117 and an AI detection and control component 119. The AI machine 116 receives, as inputs i) output information from the AI-CNN and deep learning entity 106, LAN diagnostics and telemetry information 108, IoT sensor telemetry information 110, e.g., data from security sensors at a venue, WAN diagnostics and telemetry information 112, e.g., WAN bandwidth usage information and or anomaly WAN information, wireless infrastructure network capacity information 114, e.g., cellular and/or WiFi network capacity information, and event schedule with event type information 115. The AI machine 116, e.g., an AI engine, performs: constant network learning, analysis, steady-state determinations, predictive policy recommendations, and anomaly detections, as indicated by block 118. The AI learning component 117 of AI machine 116 generates, updates and stores models 120, e.g. different models corresponding to different venues, different event types, and/or different times. The AI detection and control component 119 of AI machine 116 performs the following: i) determines network flexing, ii) generates and outputs network flexing instructions, iii) determines what network functions and services are needed and the level needed, generates and sends signals to create, request and/or activate network functionally and services, iv) detects anomalies, determines anomaly type, determines a response, and sends signals to implement the determined response and v) generates and sends signals to orchestrate implementation and operation of the network. Control signals 123 are sent from the AI detection and control component 119 of AI machine 116 to network flexing, instruction, creation and orchestration system 121, which implements the instructions, e.g. generating and sending control signals to devices at the venue, service providers, third party providers, uCPE devices, and a venue network. The network flexing instruction, creation and orchestration system 121 receives control signals 121 and performs: Intra-local area network (LAN) characteristics related operations and control 122, fixed line wide area network (WAN) creation, management and control operations 124, iii) wireless WAN creation, management and control operations 126, and iv) creation, implementation, management and control operations regarding on-demand external network connectivity and services. Intra-LAN characteristics related and control operations 122 include: universal customer premise equipment (uCPE) virtual network function (VNF) creation, control and management and resource management, automatic data flow routing, data flow prioritization, creation, control and management of on-demand services, and WiFi optimization operations. Fixed line WAN creation, management and control operations 124 include bandwidth increase operations and bandwidth decrease operations. Wireless WAN creation, control and management operations 126 includes access re-direction operations and data offload operations, i.e. from LTE to WiFi. The network flexing, instruction, creation, and orchestration system 121 also sends feedback information signal 125 to the AI detection and control component 119, including, e.g., information regarding the current status of the system and the implementation status of previously sent instructions and commands. In some embodiments, the video stream image analysis and characterization entity 104, AI-CNN and deep learning entity 106, AI-machine 116, e.g., an AI engine 116, storage for generated and/or updated models 120, and network flexing, instruction, creation, and orchestration system 121 are part of a network management system or device 103

Figure 2:
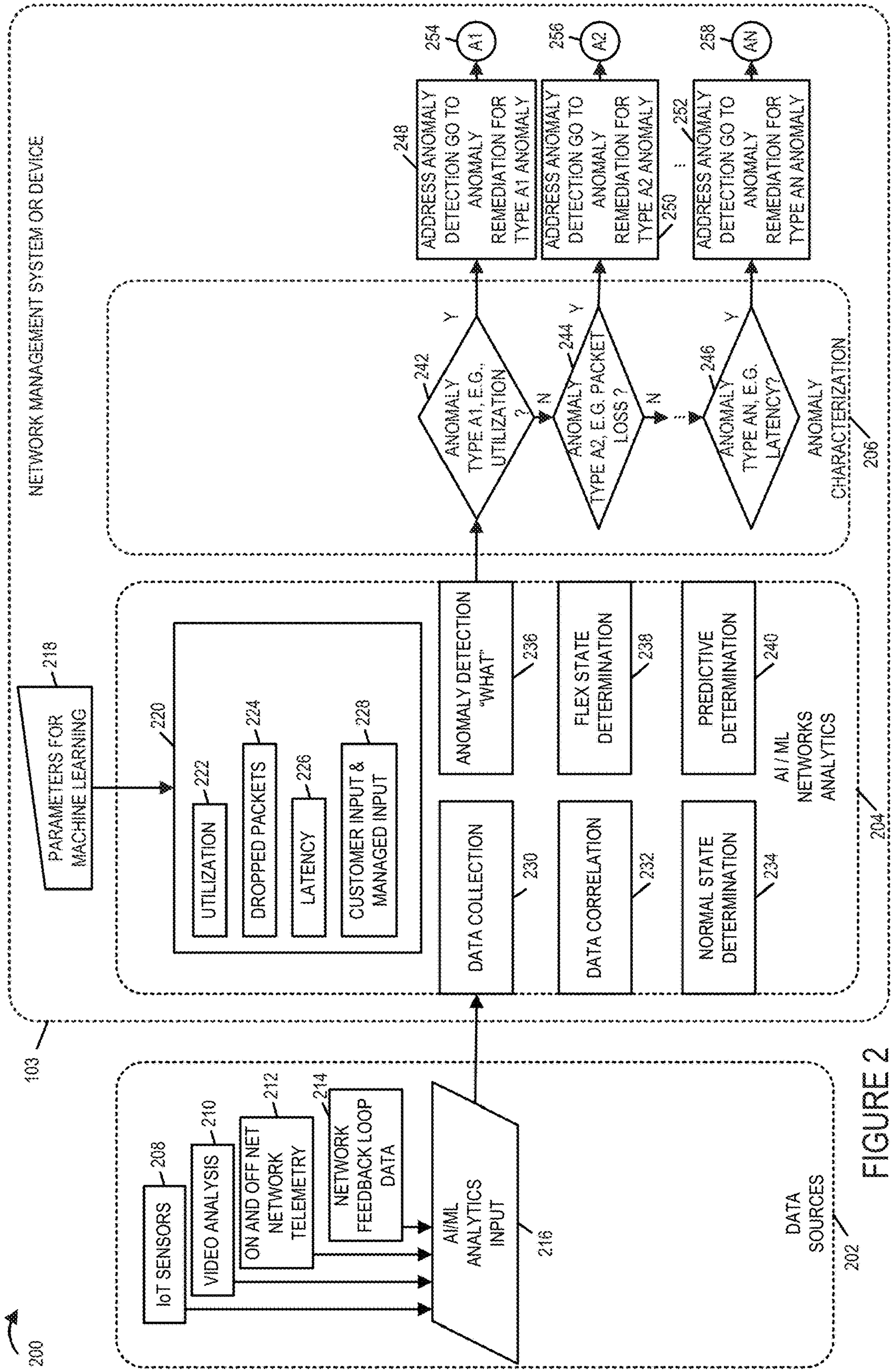
FIG. 2 is a drawing illustrating an exemplary process flow, which is an artificial intelligence/machine learning (AI/ML) process flow for anomaly detection, in accordance with an exemplary embodiment.

FIG. 2 is a drawing 200 illustrating an exemplary process flow, which is an artificial intelligence/machine learning (AI/ML) process flow for anomaly detection, in accordance with an exemplary embodiment. The AI/ML network analytics 204 of network management system or device 103 receives information signals 203 from data sources 202.

AI/ML networks analytics 204 receives: i) AI/ML analytics input information 216 from data sources 202 including IoT sensors 208, video analytics 210, On and off net network telemetry 212 and network feedback loop data 214 and ii) parameters for machine learning 218, e.g. utilization machine learning parameters, dropped packet machine learning parameters, latency machine learning parameters, customer input machine learning parameters, and managed input machine learning parameters. AI/ML network analytics 204 includes anomaly detection components 220 including: utilization anomaly detector 222, dropped packet anomaly detector 224, latency anomaly detector 226, and customer input and managed output anomaly detector 228. Data collection module 230 receives AI/ML analytics input 216. Data correlation routine 232 processes and correlates received data, e.g. identifying patterns. Normal state determination routine 234 determines what constitutes a normal state of operation, e.g. based on historical patterns. Anomaly detection "what" entity 236 forwards detected anomaly information, e.g., a set of information relating to the anomaly, from any of utilization anomaly detector 222, dropped packet anomaly detector 224, latency anomaly detector 226 or customer input and managed input anomaly detector 228 to the anomaly characterization entity 206. Flex state determination routine 238 determines how to flex the network to adjust to current and/or predicted network needs. Predictive determination routine 240 performs predictions, e.g. predicated further needs for bandwidth, numbers or uses, number of connections, type of services needed, capacity needed, etc.

Anomaly characterization routine 206 receives input from anomaly detection routine 236, determines the type of anomaly and controls operation, e.g. directs operation, to proceed along a path to address and/or remediate the particular type of anomaly which has been detected. In step 242 the anomaly detection routine determines if the detected anomaly is a type A1 anomaly, e.g. a utilization anomaly. If the detected anomaly is an A1 type anomaly, then operation proceeds from step 242 to step 248 in which the operation is controlled to proceed to connecting node A1 254, to address and/or remediate the detected type A1 anomaly (utilization type anomaly). In step 244 the anomaly detection routine determines if the detected anomaly is a type A2 anomaly, e.g. a packet loss anomaly. If the detected anomaly is an A2 type anomaly, then operation proceeds from step 244 to step 250 in which the operation is controlled to proceed to connecting node A2 256, to address and/or remediate the detected type A2 anomaly (packet loss type anomaly). In step 246 the anomaly detection routine determines if the detected anomaly is a type AN anomaly, e.g. a latency anomaly. If the detected anomaly is a latency type anomaly, then operation proceeds from step 246 to step 252 in which the operation is controlled to proceed to connecting node AN 258 to address and/or remediate the detected type AN anomaly (latency type anomaly).

Figure 3:
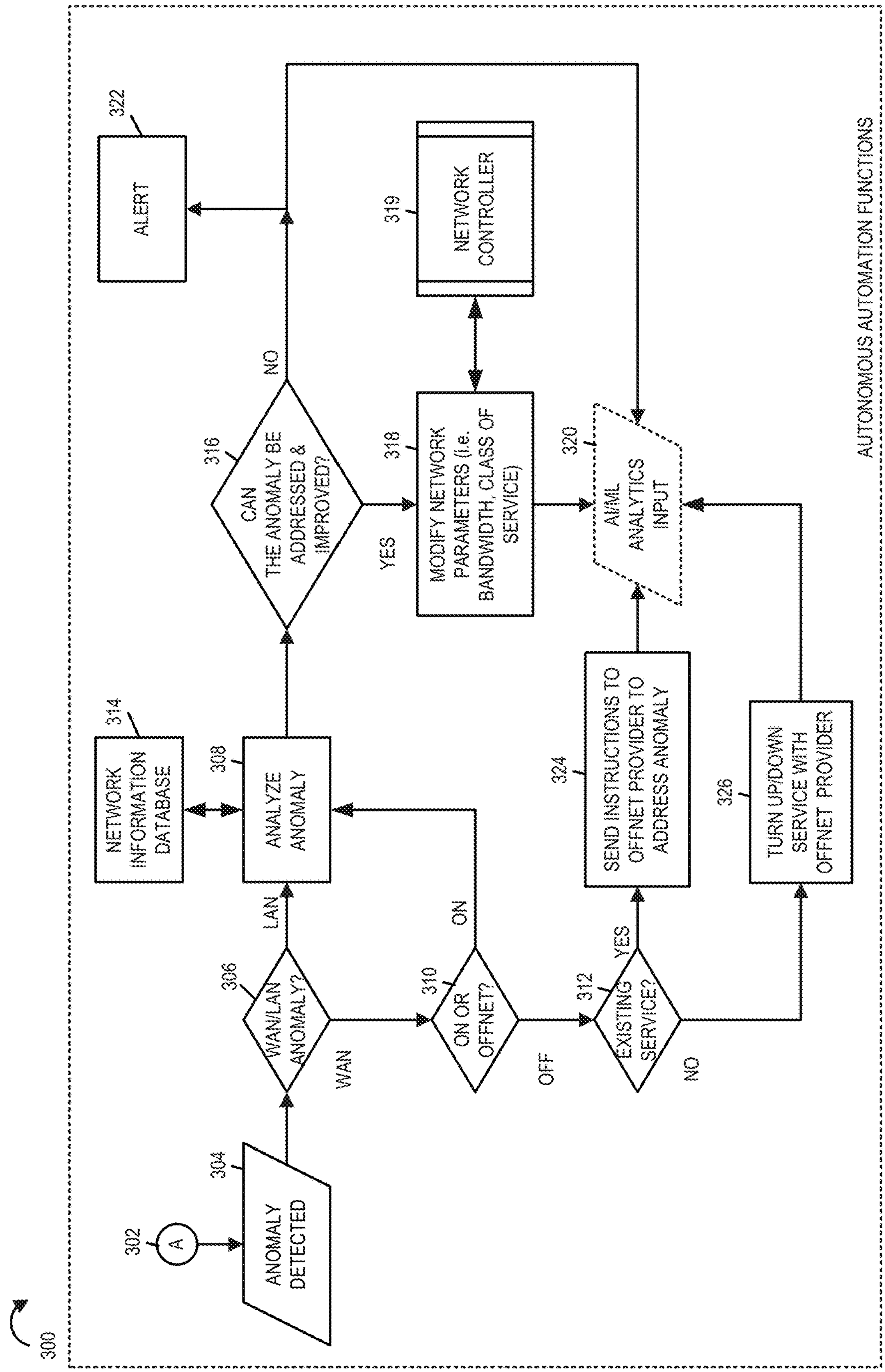
FIG. 3 is a drawing illustrating an exemplary process flow, which is autonomous automation process flow for exemplary anomaly remediation, in accordance with an exemplary embodiment.

FIG. 3 is a drawing illustrating an exemplary process flow 300, which is autonomous automation process flow for exemplary anomaly remediation, in accordance with an exemplary embodiment.

The anomaly type dictates how the network infrastructure is modified and when the modification is to be implemented. First, a determination is made as to where the network anomaly occurred including determining if the anomaly is on or off our network. In each of the cases, the process is automated with the results fed back to the network analytics engine for constant monitoring and tracking. This provides for constant network optimization in all conditions.

Multiple disparate data inputs are used in the exemplary embodiment, as opposed to just using typical network performance monitoring data. The multiple disparate data inputs include IoT data from sensors and video analytics. In accordance with a feature of various embodiments of the present invention, network optimization is automated based on the output of the network analytics engine. This automation is accomplished by multiple network provisioning, management, and orchestration platforms and through Charter developed scripting and APIs.

Operation of the exemplary process 300 flow starts with connecting node A 302, in which operation has been transferred from one of: i) connecting node A1 254 (for a detected utilization type anomaly), ii) connecting node A2 256 (for a detected packet loss type anomaly), or iii) connecting node AN 258 (for a detected latency type anomaly), of drawing 200 of FIG. 2. Detected anomaly information 304 is input to step 306 in which a determination is made as to whether the detected anomaly pertains to a WAN or a LAN. If the detected anomaly is a WAN anomaly then operation proceeds from step 306 to step 310; however, if the detected anomaly is a LAN anomaly then operation proceeds from step 306 to step 308. Returning to step 310, in step 310 a determination is made as to whether the detected WAN anomaly is on or off net. If the detected WAN anomaly is on net, then operation proceeds from step 310 to step 308; otherwise, operation proceeds from step 310 to step 312.

Returning to step 308, in step 308 the anomaly is analyzed using the network information database 314. The results of the analysis are fed to determination step 316, in which a determination is made as to whether or not the anomaly can be addressed and improved.

If the determination of step 316 is that the anomaly cannot be addressed and improved, then operation proceeds from step 316 to alert step 322 and the determination result is fed as input to AI/ML analytics input 320. Alternatively, if the determination of step 316 is that the anomaly can be addressed and improved, then operation proceeds from step 316 to step 318, in which the network parameters (i.e. bandwidth, class of service, etc.) are modified. The modified network parameters are used by the network controller 319 to control the network. The results of step 318 are also sent to AI/ML input 320.

Returning to step 312, in step 312 a determination is made as to whether the detected WAN off net anomaly corresponds to an existing service. In response to a determination that the WAN off net anomaly corresponds to an existing service, operation proceeds from step 312 to step 324. In step 324, instructions are generated and sent to an offnet provider, e.g. a 3rd party provider, to address the anomaly. Information corresponding to instructions, e.g. identifying modification to the existing service, is also sent as input to the AI/ML analytics input 320.

Alternatively, in response to a determination that the WAN offnet anomaly does not correspond to an existing service, operation proceeds from step 312 to step 326. In step 326 service with the offnet provider is turned up or down. Information corresponding to instructions, e.g. identifying modification to turn up/down service, is also sent as input to the AI/ML analytics input 320.

Figure 4:
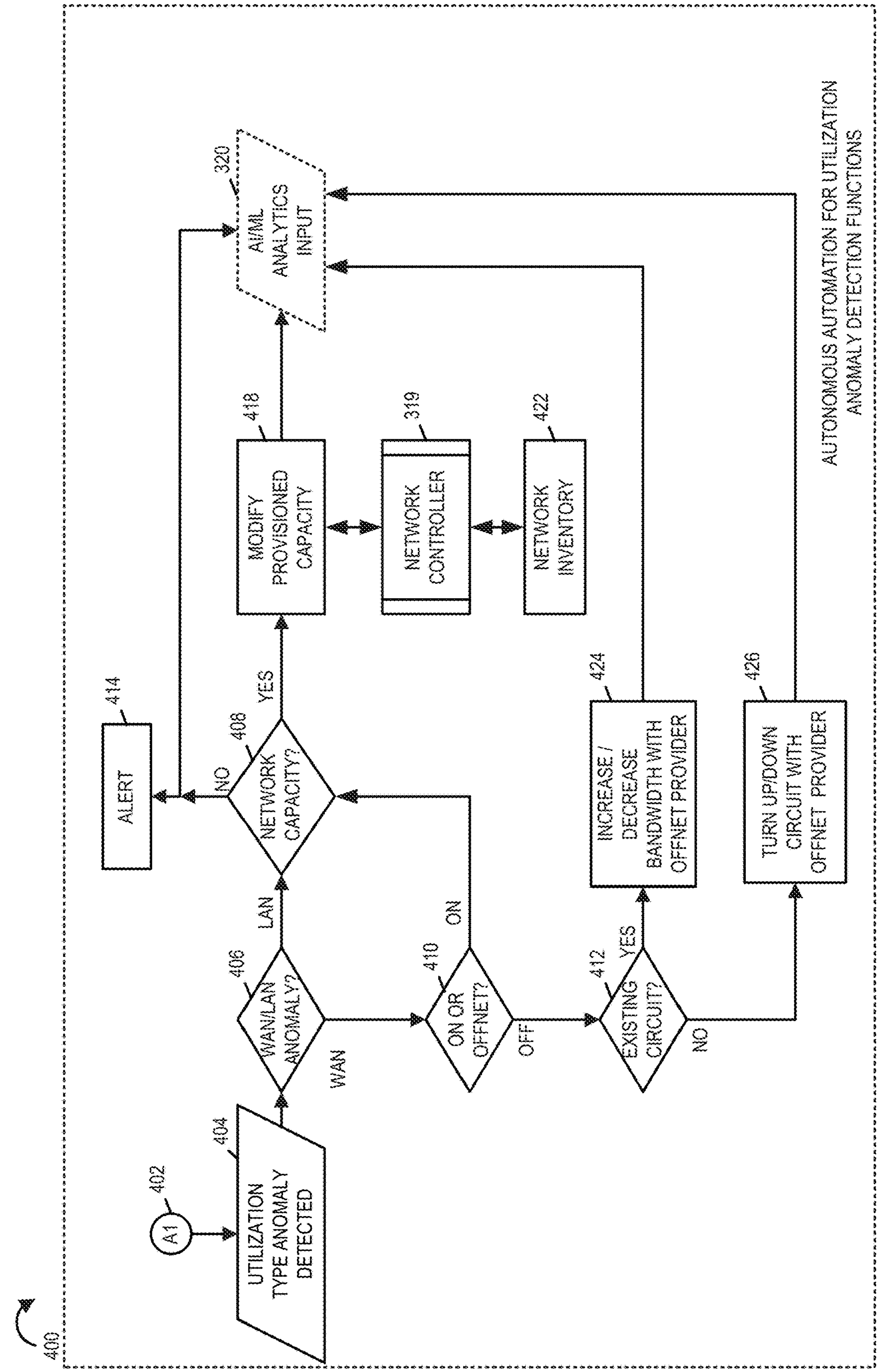
FIG. 4 is a drawing illustrating an exemplary process flow, which is autonomous automation process flow for exemplary utilization type detected anomaly remediation, in accordance with an exemplary embodiment.

FIG. 4 is a drawing illustrating an exemplary process flow 400, which is autonomous automation process flow for exemplary utilization type detected anomaly remediation, in accordance with an exemplary embodiment. Operation of the exemplary process 400 flow starts with connecting node A1 402, in which operation has been transferred from connecting node A1 254 (for a detected utilization type anomaly) of drawing 200 of FIG. 2. Detected utilization type anomaly information 404 is input to step 406 in which a determination is made as to whether the detected anomaly pertains to a WAN or a LAN. If the detected anomaly is a WAN anomaly then operation proceeds from step 406 to step 410; however, if the detected anomaly is a LAN anomaly then operation proceeds from step 406 to step 408. Returning to step 410, in step 410 a determination is made as to whether the detected WAN anomaly is on or off net. If the detected WAN anomaly is on net, then operation proceeds from step 410 to step 408; otherwise, operation proceeds from step 420 to step 412.

Returning to step 408, in step 408 the anomaly is analyzed using the network information database to determine if the provisioned network capacity can be modified to address the anomaly.

If the determination of step 404 is that the provisioned network capacity cannot be modified to address the anomaly, then operation proceeds from step 408 to alert step 414 and the determination result is also fed as input to AI/ML analytics input 320. Alternatively, if the determination of step 408 is that the provisioned network capacity can be modified to remediate the anomaly, then operation proceeds from step 408 to step 418, in which provisioned capacity is modified to remediate the anomaly, e.g. network capacity is increased to remediate the utilization type anomaly. The modified network parameters, identifying the modified provisioned capacity (of step 418) are used by the network controller 319 to control the network, e.g., network controller 319 uses the modified (adjusted level of) provisioned capacity from network inventory. The results of step 418 are also sent to AI/ML input 320.

Returning to step 410, in step 412 a determination is made as to whether the detected WAN off net anomaly corresponds to an existing service. In response to a determination that the WAN off net anomaly corresponds to an existing circuit, operation proceeds from step 412 to step 424. In step 424, instructions are generated and sent to an offnet provider to increase or decrease the bandwidth with the offnet provider. Information corresponding to the instructions to increase or decrease bandwidth with the offnet provider with regard to existing circuit are also sent as input to the AI/ML analytics input 320.

Alternatively, in response to a determination that the WAN offnet anomaly does not correspond to an existing circuit, operation proceeds from step 412 to step 426. In step 426 instructions are sent to turn up/down circuit with the offnet provider. Information corresponding to instructions, e.g. identifying modification to turn up/down circuit, is also sent as input to the AI/ML analytics 320.

Figure 5:
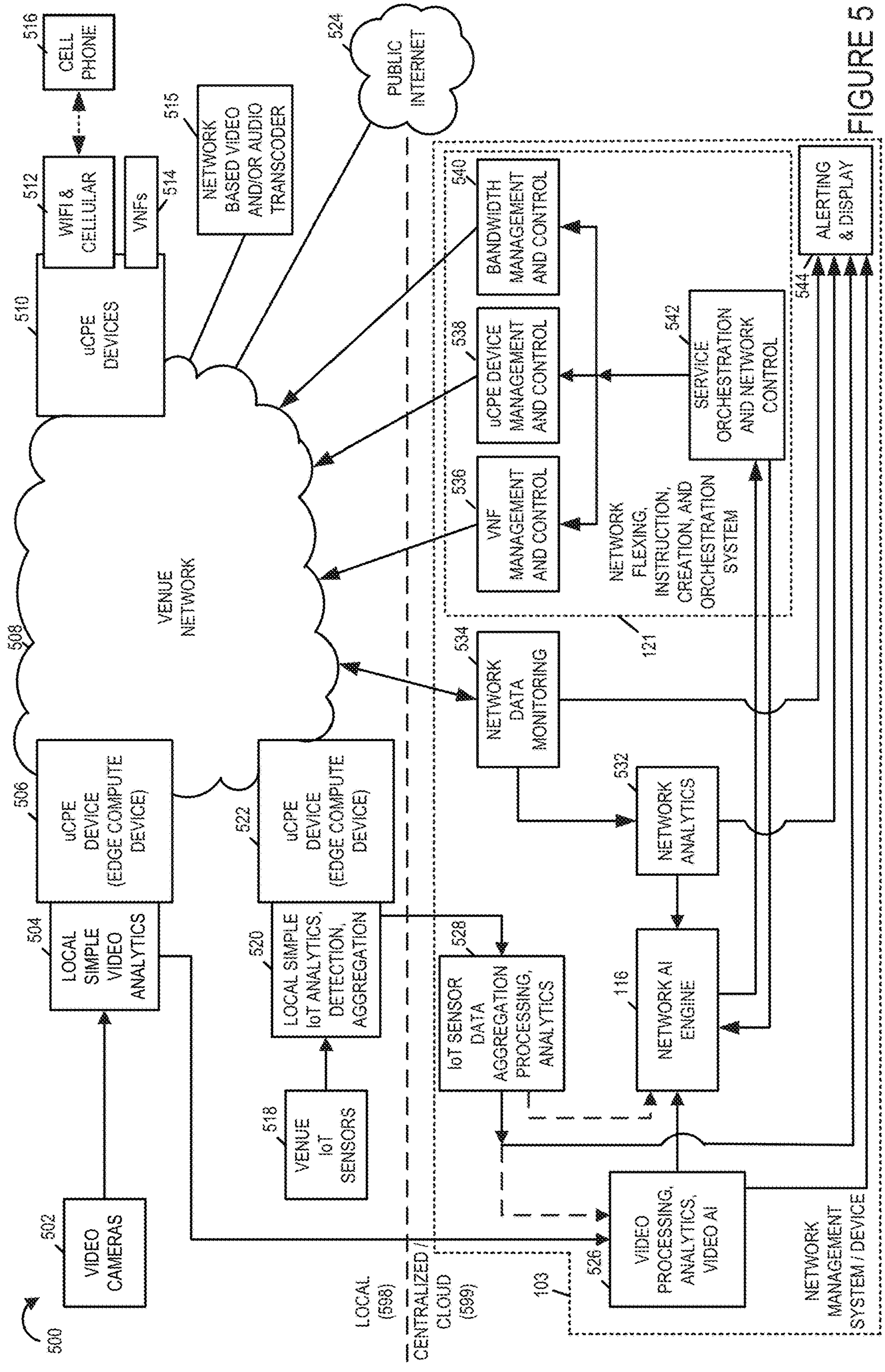
FIG. 5 is a drawing of an exemplary system in accordance with an exemplary embodiment.

FIG. 5 is a drawing of an exemplary system 500 in accordance with an exemplary embodiment. Exemplary system 500 includes a local portion 598 and a centralized or cloud portion 599. The local portion 598 may correspond to a venue, e.g. a stadium or arena and corresponding parking lots. Local portion 598 includes a plurality of video cameras 502, local simple video analytics 504, a venue network, a plurality of universal customer premise equipment (uCPE) devices, which are edge devices at the edge of the venue network (uCPE 506, uCPE 510, uCPE 522), venue IoT sensors 518, e.g. security sensors, local simple IoT analytics, detection and aggregations device 520, WiFi and cellular devices 512, e.g., WiFi access points and cellular base stations, VNFs 514, and a plurality of user devices 516, e.g., cell phones. The system also includes a network based video and/or audio transcoder 515 which provides transcoding services so that devices at one or more venues can receive and/or send video in formats which are supported by various user devices at one or more venues while the video format supported by the supplier of the content and/or destination outside the venue may use a different coding format then is supported by the user device or devices at one or more venues. Thus network based transcoding services can be contracted for and supplied to users at a venue with the amount of transcoding services potentially varying depending on the predicted and/or actual needs for such services.

The video cameras 502 are coupled to the local simple video analytics 504, and the local simple video analytics are coupled to or included as part of uCPE device 506. The venue IoT sensors 518 are coupled to the local simple IoT analytics, detection and aggregations entity 520, and the local simple IoT analytics, detection and aggregations entity 520 is coupled to or included as part of uCPE device 522. WiFi and cellular devices 512 and coupled to or included as part of uCPE device 510. The user equipment (UE) devices 516 are coupled to the WiFi and cellular devices, e.g. APs and base stations, via wireless communications links. VNFs 514 are coupled to or included as part of uCPE device 510. The venue network 508 is further coupled to public internet 524.

The centralized or cloud portion 599 of system 500 includes a video processing, analytics, and video AI component 526, a IoT sensor data aggregation, processing and analytics component 528, network AI engine 116, network analytics 532, a network data monitoring entity 534, network analytics 532, network flexing, instruction, creation, and orchestration system 121, and alerting and display device coupled together as shown in FIG. 5. Network flexing, instruction, creation and orchestration system 121 includes service orchestration and network control device, routine, entity or function 542, VNF management and control device, program, entity or function 536, uCPE device management and control device, routine, entity or function 538 and bandwidth management and control device, routine, entity or function 540.

Messages sourced from local simple video analytics 504 are received an input by video processing analytics and video AI entity 526. Messages sourced from local simple IoT analytics, detection and aggregation entity 520 are received as input by IoT sensor data aggregation, processing and analytics entity 528. In some embodiments output from IoT sensor data aggregation, processing and analytics entity 528 is sent as input to video processing analytics and video AI entity 526. In other embodiments output from IoT sensor data aggregation, processing and analytics entity 528 is sent as input to network AI engine 116. Output from video processing analytics and video AI entity 526 is sent as input to network AI engine 116.

Network data monitoring device, routine, entity or function 534 monitors for and receives network data (e.g., corresponding to WAN and/or LAN networks which may included both on and off net networks) from the venue network 508 and send the detected collected results to network analytics 532, which analysis the received collected network data, and sends the analyzed results as input to network AI engine 116.

Network AI engine 116 processes the received inputs from the video processing, analytics and video I 526, IoT sensor data aggregation, processing and analytics 528 and network analytics 532, using AI, machine learning and stored models, and generates and sends control signals and/or instructions for modifying and or controlling the network, to service orchestration and network control 542. The service orchestration and network control 542 generates and sends specific instructions to each of one or more or all of: VNF management and control 536, uCPE device management and control 538 and bandwidth management and control 540 to control and/or reconfigure the various elements within the system (flex the system) in accordance with the commands and instructions from the network AI engine 116. Each of the VNF management and control 536, uCPE device management and control 538 and bandwidth management and control 540 devices, routines, entities or functions, generates and sends control signals via venue network 508 to one or more particular devices or networks which are to be controlled, adjusted or modified.

Alerting and display entity 544, e.g., a control panel including display, lights and alarms, can, and sometimes does, receive alert information, e.g. from one or more of network data monitoring entity 534, network analytics 532*m* IoT sensor data processing and analytics 528 and/or video processing, analytics and video AI 526.

Feedback information, e.g. regarding network status, is sent from service orchestration and network control device, routine, entity or function 542 to network AI engine 116.

In some embodiments, the video processing, analytics, and vide AI 526, IoT sensor data aggregation, processing and analytics 528, network data monitoring 534, network analytics 532, network AI engine 116, network flexing, instruction, creation and orchestration system 121 and alerting and display entity 544 are includes as part of a network management system or device 103.

Figure 6:
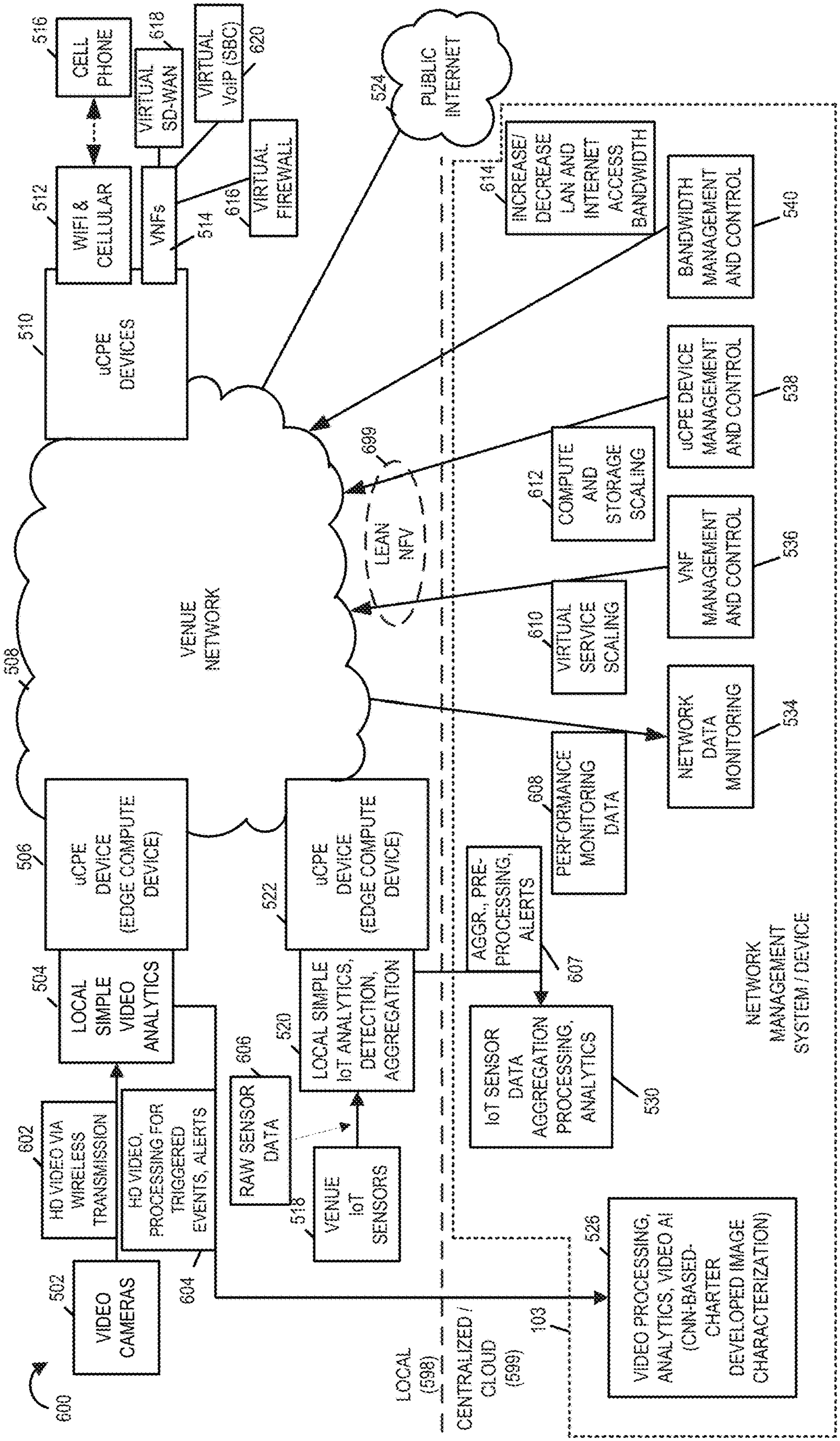
FIG. 6 is a drawing illustrating intra-local and local to centralized/cloud exemplary signaling and messaging in exemplary system of FIG. 5 in accordance with an exemplary embodiment.

FIG. 6 is a drawing 600 illustrating intra-local and local to centralized/cloud exemplary signaling and messaging in exemplary system 500 of FIG. 5 in accordance with an exemplary embodiment. Video camera 502 generates and transmits signals, e.g. wireless signals, conveying HD video messages 602 directed to local simple video analytics. The local simple video analytics 504 generates and sends messages 604 conveying HD video, processing information for triggered events, and/or alert information to video processing, analytics, and video AI entity 526. Venue IoT sensors 518 generate and send messages 606 conveying raw sensor data, said messages being directed to local simple IoT analytics, detection and aggregation entity 520. The local simple IoT analytics, detection and aggregation entity 520 generates aggregated messages 607 communicating IoT sensor based aggregated information, pre-processing information, and/or alerts directed to IoT sensor data aggregation, processing and analytics entity 530. Network data monitoring entity 534 receives, via the venue network 508, messages 608 communicating performance monitoring data, e.g. corresponding to a WAN network and a LAN network.

VNF management and control entity 536 generates and sends messages 610 communicating virtual service scaling information, e.g. virtual service scaling information related to VNFs 514, virtual SD-WANs 618, virtual firewalls 616, Virtual VOIP including Session border controllers 620. uCPE device management and control entity 538 generates and sends messages 612 communicating compute and storage scaling information related to uCPEs 506, 510, 522. Bandwidth management and control entity 540 generates and sends messages 614 communicating information indicating one or more of: i) increase a LAN bandwidth, ii) decrease a LAN bandwidth, iii) increase Internet access bandwidth, iv) decrease Internet access bandwidth. In some embodiments, messages 610 and 612 are communicated via a lean NFV.

Figure 7:
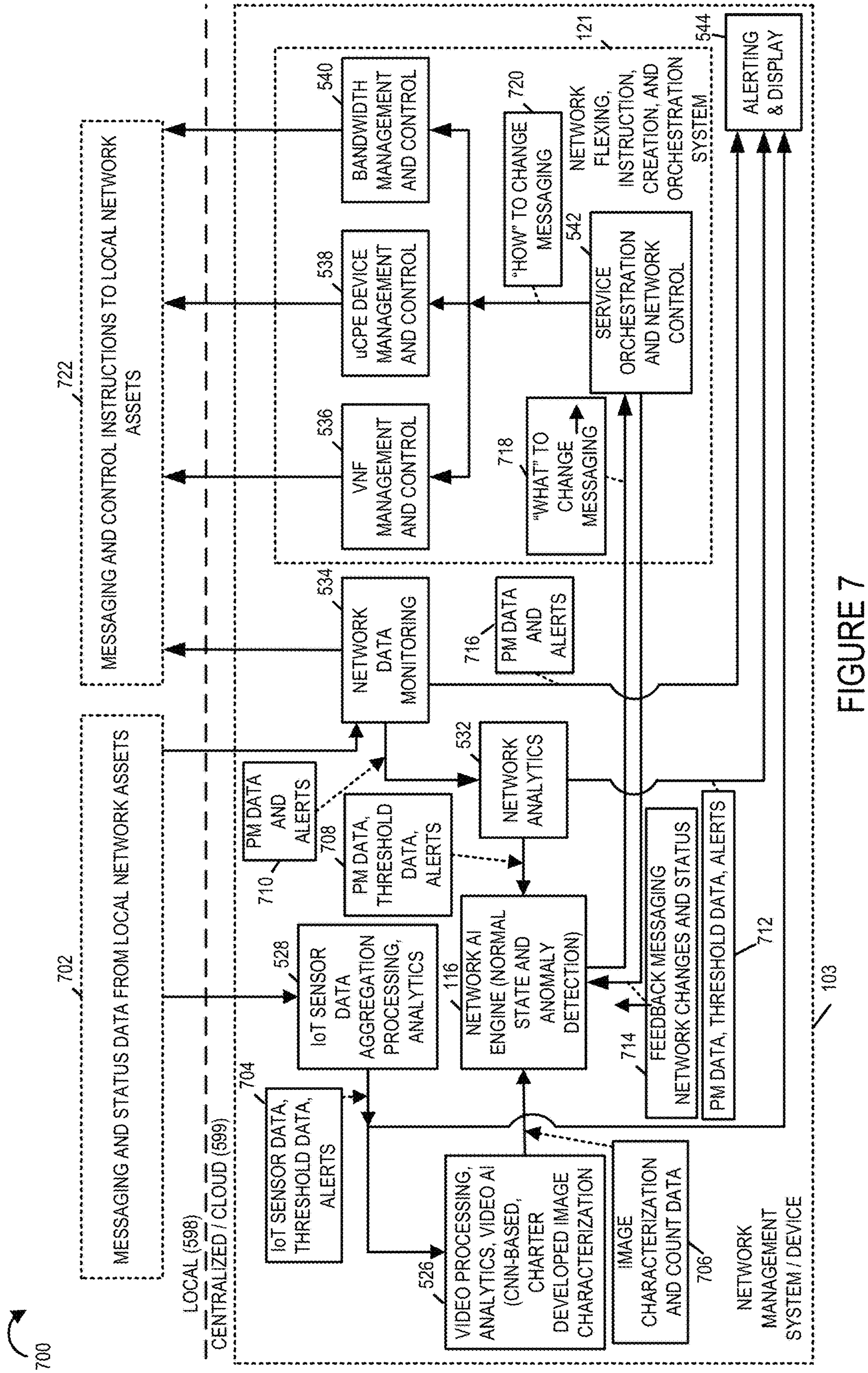
FIG. 7 is a drawing illustrating intra-centralized/cloud exemplary signaling and messaging in exemplary system of FIG. 5 in accordance with an exemplary embodiment.

FIG. 7 is a drawing 700 illustrating intra-centralized/cloud exemplary signaling and messaging in exemplary system 500 of FIG. 5 in accordance with an exemplary embodiment.

IoT sensor data, aggregation, processing and analytics entity 528 generates and sends messages 704 communicating IoT sensor data, threshold data and/or alerts to video processing analytics and video AI entity 526 and alerting and display device 544. Video processing analytics and video AI entity 526 generates and sends messages 706 communicating image characterization information and count data to network AI engine 116. Network data monitoring 534 generates and sends messages 710 communicating PM data and alters to network analytics 532. Network analytics 532 generates and sends messages 708 communicating PM data, threshold data and/or alerts to network AI engine 116. Network AI engine 116 generates and sends messages 718 indicating what to change to the service orchestration and network control entity 542. Service orchestration and network control entity 542 generates and sends feedback messages 714, indicating network changes and status, to the network AI engine 116. Network data monitoring entity 534 generates and sends messages 716 communicating PM data and/or alerts to the alerting and display device 544. Service orchestration and network control entity 542 generates and sends messages 542, indicating how to change the network, to one or more of VNF management and control entity 536, uCPE device management and control entity 538 and bandwidth management and control entity 540.

Drawing 700 further illustrates that messaging and status data 702 from local network assets in the local portion 598 is sent to the IoT sensor data aggregation and processing analytics 528 and to the network monitoring data entity 534 of the centralized/cloud portion 599. Drawing 700 further illustrates that messaging and control instructions 722 directed to local network assets of the local portion 598, are sent from one or more or all of: network data monitoring entity 534, VNF management and control entity 536, uCPE device management and control entity 538 and bandwidth management and control entity 540 of the centralized/cloud portion 599.

Figure 8:
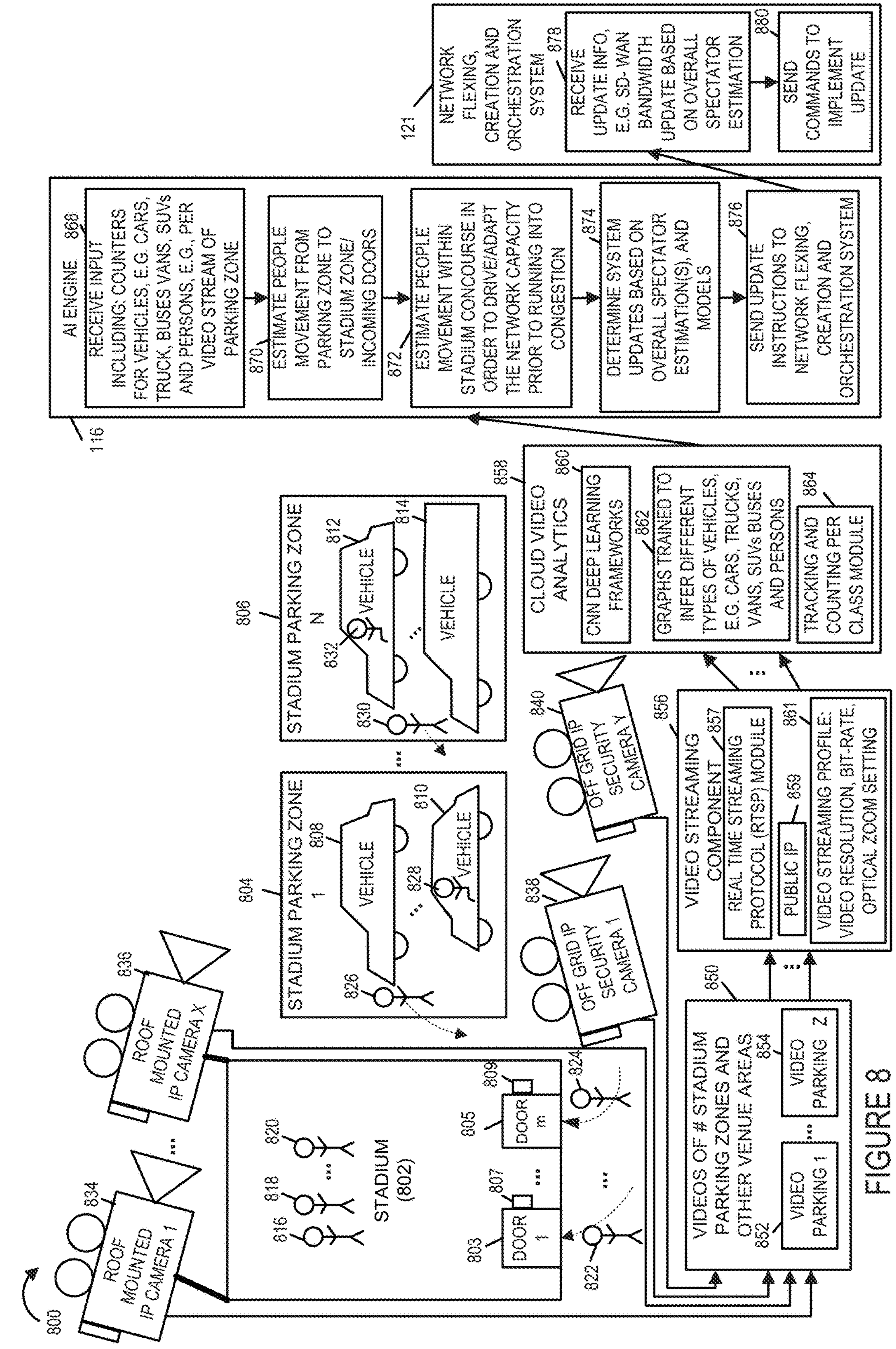
FIG. 8 is drawing illustrating parking video analytics in accordance with an exemplary embodiment.

FIG. 8 is drawing 800 illustrating parking video analytics in accordance with an exemplary embodiment. Drawing 800 illustrates an exemplary stadium 802, a plurality of stadium parking zones (stadium parking zone 1 804, . . . , stadium parking zone N 806), a plurality of roof mounted IP cameras (roof mounted IP camera 1 834, . . . , roof mounted IP camera X 836), and a plurality of off grid IP security cameras (off grid IP security camera 1 838, . . . , off grid IP security camera Y 840). In each of the parking zones, there are a plurality of vehicles and a plurality of people. Stadium parking zone 1 804 includes: vehicle 808, e.g. a SUV, vehicle 810, e.g. a small car, including one person 828 (visible in the image), and one pedestrian 826, e.g., walking toward the stadium entrance. Stadium parking zone N 806 includes: vehicle 812, e.g. a SUV, including 1 person 832 (visible in the image), vehicle 814, e.g. a bus, and one pedestrian 830, e.g., walking toward the stadium entrance. In some embodiments, people within a vehicle are not monitored for, detected and counted. In some such embodiments, the number of people, e.g. spectators, corresponding to a detected vehicle is estimated based on the type of vehicle, e.g. car, truck, SUV, bus, and/or historical information or predetermined person counts associated with each type or classification of vehicle. In other embodiments, the number of spectators corresponding to a vehicle is estimated used both the vehicle type detected and counted persons visible within the vehicle.

Outside the stadium 802 near door 1 803 is one person 822 walking toward the entrance (door 1). Outside the stadium 802 near door 2 805 is one person 824 walking toward the entrance (door 2). In some embodiments, there are IoT sensors (807, 809), e.g., turn style sensors or other people sensors, used to detect and report entrance, at or near the doors (803, 805). Within the stadium 802 are three people (816, 818, 820), who are currently stationary.

Videos 850 of the stadium parking zones, stadium entrance/exit areas, and/or internal stadium areas are captured from video feeds from the various cameras (834, . . . , 836, 838, . . . 840). Captured videos 850 includes video parking 1 852, . . . , video parking z 854). In some embodiments, each parking zone corresponds to a unique set of one or more cameras. In other embodiments, different portions (e.g., different pre-defined portions) of a field of view from a camera may correspond to different parking zones. Block 856 represents a video streaming component, e.g. a video streaming aggregation, control and forwarding component. Video streaming component 856 includes a real time streaming protocol (RTSP) module 856, and a public IP 859. Video streaming component 856 also receives, determines and/or sends video streaming profile information 861, e.g. corresponding to received video streams from the cameras and/or processed video streams, e.g., generated based on received video streams. Video streaming component 856 sends video stream(s) and corresponding video profile information to cloud video analytics 858.

Cloud video analytics 858 includes CNN deep learning frameworks 860, graphs 862 trained to infer different type of vehicles from captured images, e.g. cars, trucks, vans, SUV, buses, and infer people from captured images, and tracking and counter module 864 configured to perform tracking and counting on a per class basis, e.g., number of cars in an image, number of trucks in an image, number of vans in an image, numbers of SUVs in an image, number of buses in an image, numbers of people in an image, numbers of different types of vehicles entering an area over a given time interval, numbers of people migrating toward a stadium over a given time interval, numbers of different types of vehicles leaving a parking area over a given time interval, number of people migrating away from a stadium towards a parking area over a given time interval, etc.

Captured video(s) (852, 854) and/or processed videos and corresponding profile information is fed, by the video streaming component 856, as input to cloud video analytics 858. The cloud video analytics 858 includes CNN deep learning frameworks 860. Graphs 862 are trained to infer cars, SUVs, trucks, persons, buses from the captured images. Tracking is performed and counters per class are maintained by module 864. The output of the cloud video analytics 858 is fed as input to the AI engine 116.

The A1 engine 116 performs steps 868, 870, 872, 874 and 876. In step 868 the A1 engine receives input including: counters for various different types of vehicles, e.g. cars, trucks, vans, SUVs, and for persons per video stream, e.g. of a parking zone. In step 870 the A1 engine estimates people movement from parking zone to stadium zone/incoming doors. In step 873 the AI engine estimates people movement within the stadium concourse in order to drive/adapt the network capacity prior to running into congestion. In step 874 the A1 engine determines system updates based on overall spectator estimation(s) and using current machine learning models, e.g. corresponding to the particular event, venue and/or time. IN step 876 the AI engine generates and sends command and instructions to a network flexing, creation and orchestration system 121.

The network flexing, creation and orchestration system 121 performs steps 878 and step 880. In step 878 the system 121 receives update information, e.g. an SD-WAN bandwidth update based on overall spectator estimation(s). In step 880 the system 121 sends commands to implement the update, e.g. send messaging and control instructions to local network assets at the venue or to devices which control local network assets at the venue to implement the update, e.g. increase or decrease SD-WAN bandwidth in response to anticipated bandwidth needs.

Various aspects and/or features related to parking video analytics in accordance with an exemplary embodiment of the present invention will now be described. In some embodiments, one or more or all of: convolutional windows, Kernel filters, pooling, search in the image, and image size reduction are used, e.g. for optimized quick search. Caffe, darknet, Cuda/GPGPU, OpenCV, OpenGI and many image processing frameworks can be, and sometimes are, used. In some embodiments, a trained graph model (Neural Network weights) with mixed Mobilenet SSf and MobileNet is used. In some embodiments, the exemplary method includes approximating from one frame to another the positions and numbers of cars, trucks, buses and persons that are new to the zone or out of the zone. The frames used in the approximation are not necessarily consecutive. In some embodiments, tracking is beneficial to reduce the occurrence of feeding the video frames to an inference model and can also reduce the number of frames per second (FPS) requested from the encoder at each camera and how often the streaming module needs to send feeds to the cloud.

In some embodiments, each of the video feeds of the different parking zones of the stadium are aggregated into one streaming module. In some embodiments, based on the delay and each video resolution, the best frames are picked for inference and for the creation of video with detection, tracking and counters per class.

In some embodiments, the parking video analytics calculates based on each video what is the estimated number of spectator per each parking zone.

After the inference and the tracking of the classes of interest, the number of spectators for each type of vehicle is approximated, e.g., the number of spectators for each bus is 40, the number of spectators for each car is 4, and the number of spectators for each truck is 5. Other ratios of number of spectators to each type of vehicle are possible. In some embodiments, the ratios are determined based on machine learning and AI.

In some embodiments, every predetermined time period, e.g. every 2 or 3 minutes, the parking video analytics aggregates the approximated number of spectators into one single value for the entire incoming spectators to the stadium.

In various embodiments, the total occupancy of the stadium is being offered by a KAFKA-JSON producer and consumed by a module to estimate the power that should be allocated to the analytic engine driving the SD-WAN adaptations.

Figure 9:
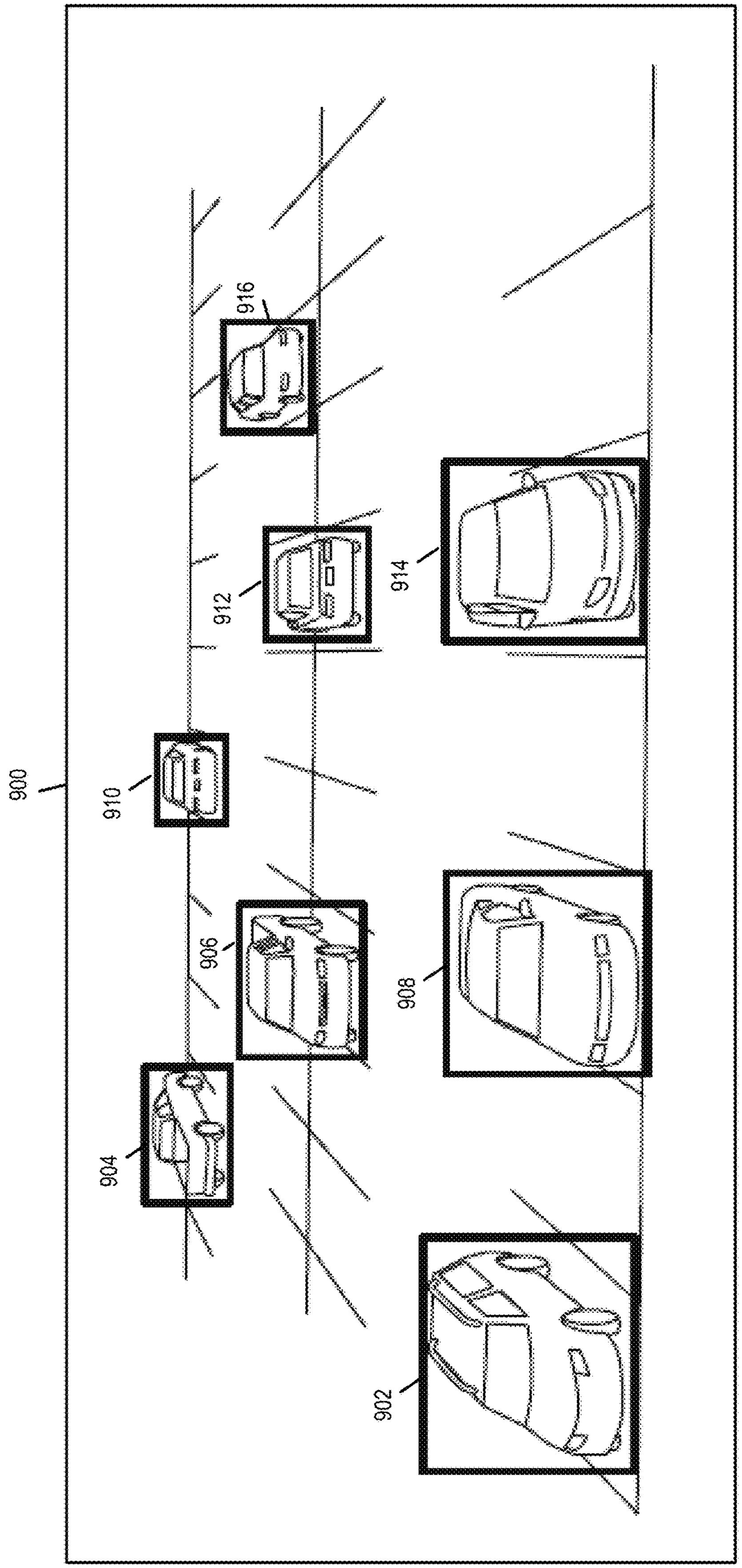
FIG. 9 is a drawing illustrating an exemplary processed captured image of a parking lot zone of a stadium.

FIG. 9 is a drawing illustrating an exemplary processed captured image 900 of a parking lot zone of a stadium. The processed captured image 900 indicates that the following have been detected: one van 902, two trucks 906, 808, and five cars 908, 910, 912, 914, 916. In one example the number of spectators, corresponding to the parking zone for the FIG. 9 example, is estimated to be 23 spectators (based on person/vehicle ratios of: 4 persons/van, 2 persons/truck and 3 persons/car being used by the analytics, 1 van×4 persons/van+2 trucks×2 persons/truck+5 cars×3 persons/car=23 persons). Captured video images are captured and analyzed, e.g., using parking video analytics, in accordance with an exemplary embodiment.

The parking video analytics detects and counts different types of vehicles, e.g., trucks, vans, cars, SUVs, buses, etc. In some embodiments, the parking video analytics further detects and counts persons in the parking lot zone (e.g. out of vehicle persons). The parking video analytics estimates a zone number of spectators, e.g. based on a number of spectators corresponding to each type of vehicle (e.g., 2 persons for a pick-up truck, 3 persons for a car, 4 persons for a van or SUV, 30 persons for a bus) and a count of vehicles of each type detected within the parking zone being analyzed. Video corresponding to different parking lots zones is analyzed using the parking video analytics. Then, the results corresponding to different parking lot zones are combined to determine an estimated number of spectators for the event.

Figure 10A:
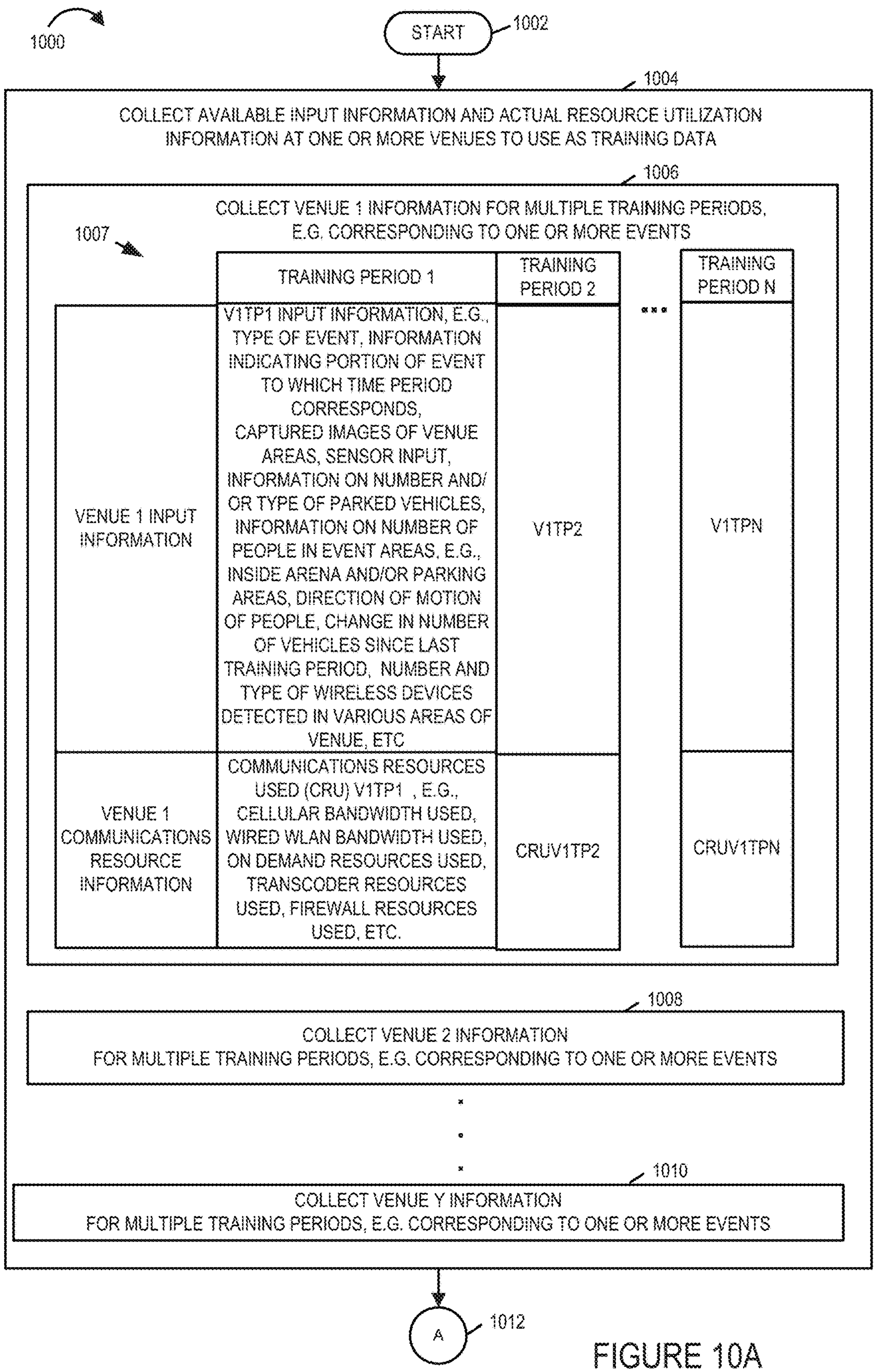
FIG. 10A is a first part of a flowchart of an exemplary method of operating a management system in a communications network to manage communications services corresponding to one or more venues including a first venue in accordance with an exemplary embodiment.
Figure 10B:
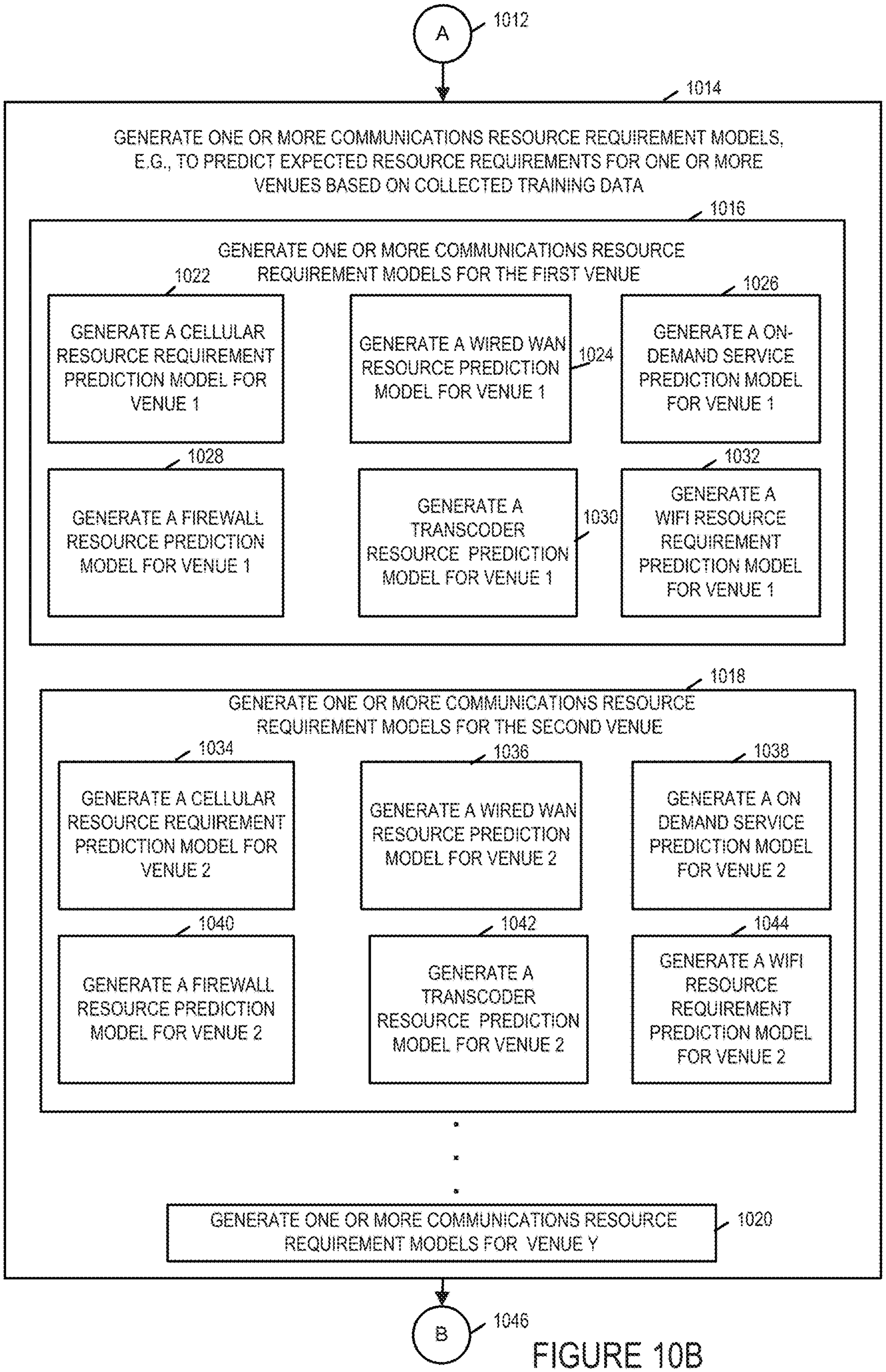
FIG. 10B is a second part of a flowchart of an exemplary method of operating a management system in a communications network to manage communications services corresponding to one or more venues including a first venue in accordance with an exemplary embodiment.
Figure 10C:
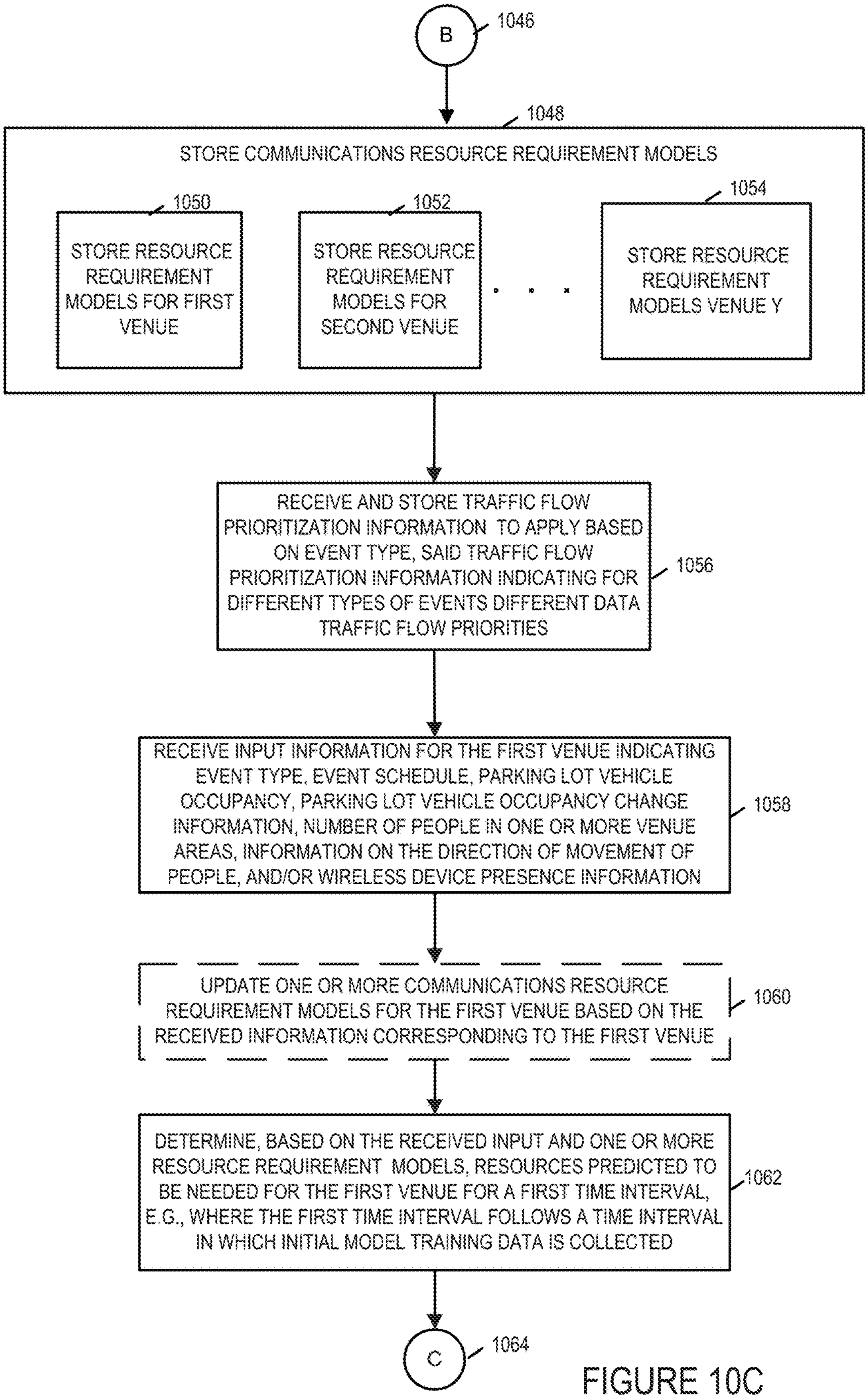
FIG. 10C is a third part of a flowchart of an exemplary method of operating a management system in a communications network to manage communications services corresponding to one or more venues including a first venue in accordance with an exemplary embodiment.
Figure 10D:
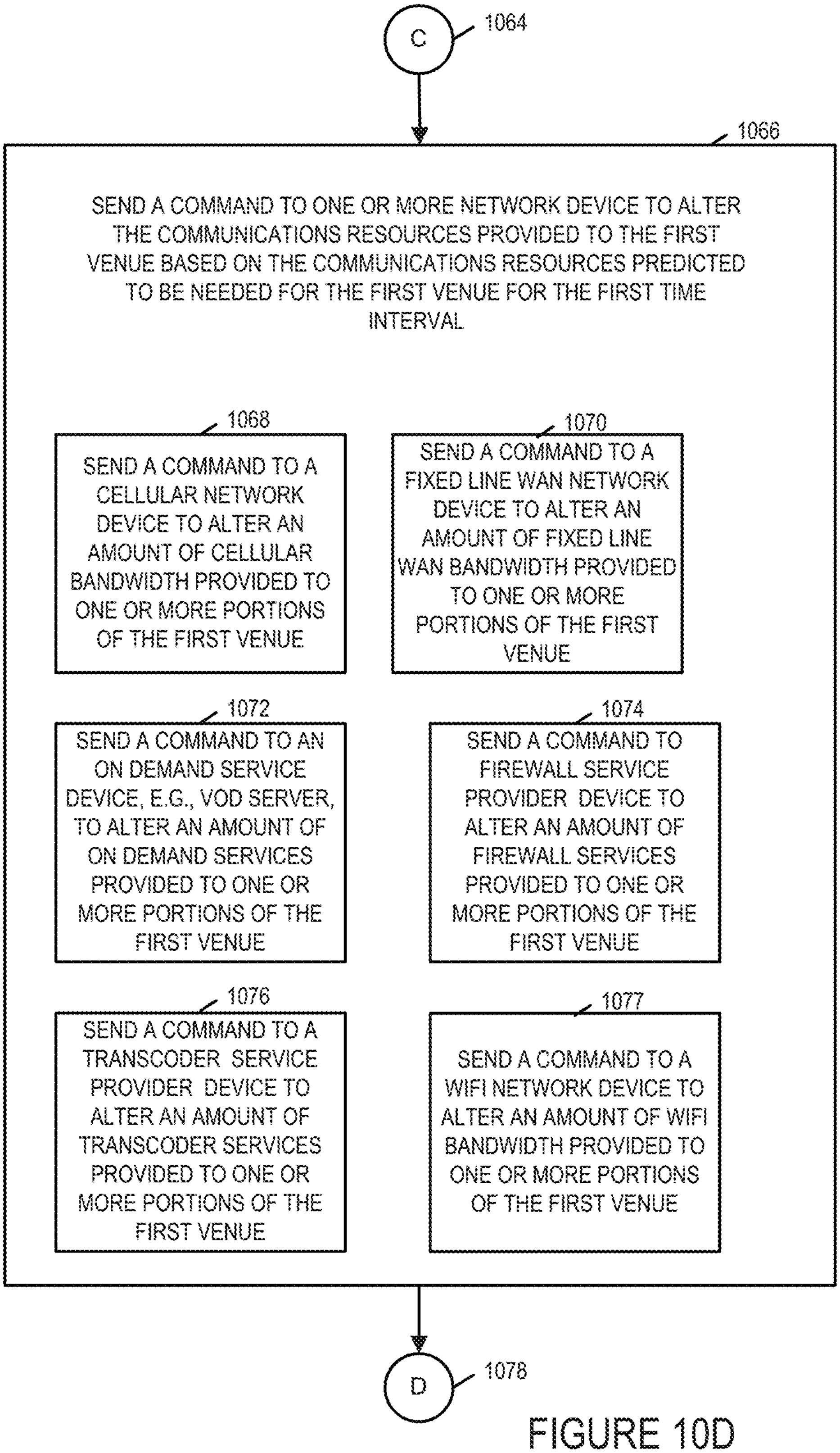
FIG. 10D is a fourth part of a flowchart of an exemplary method of operating a management system in a communications network to manage communications services corresponding to one or more venues including a first venue in accordance with an exemplary embodiment.
Figure 10E:
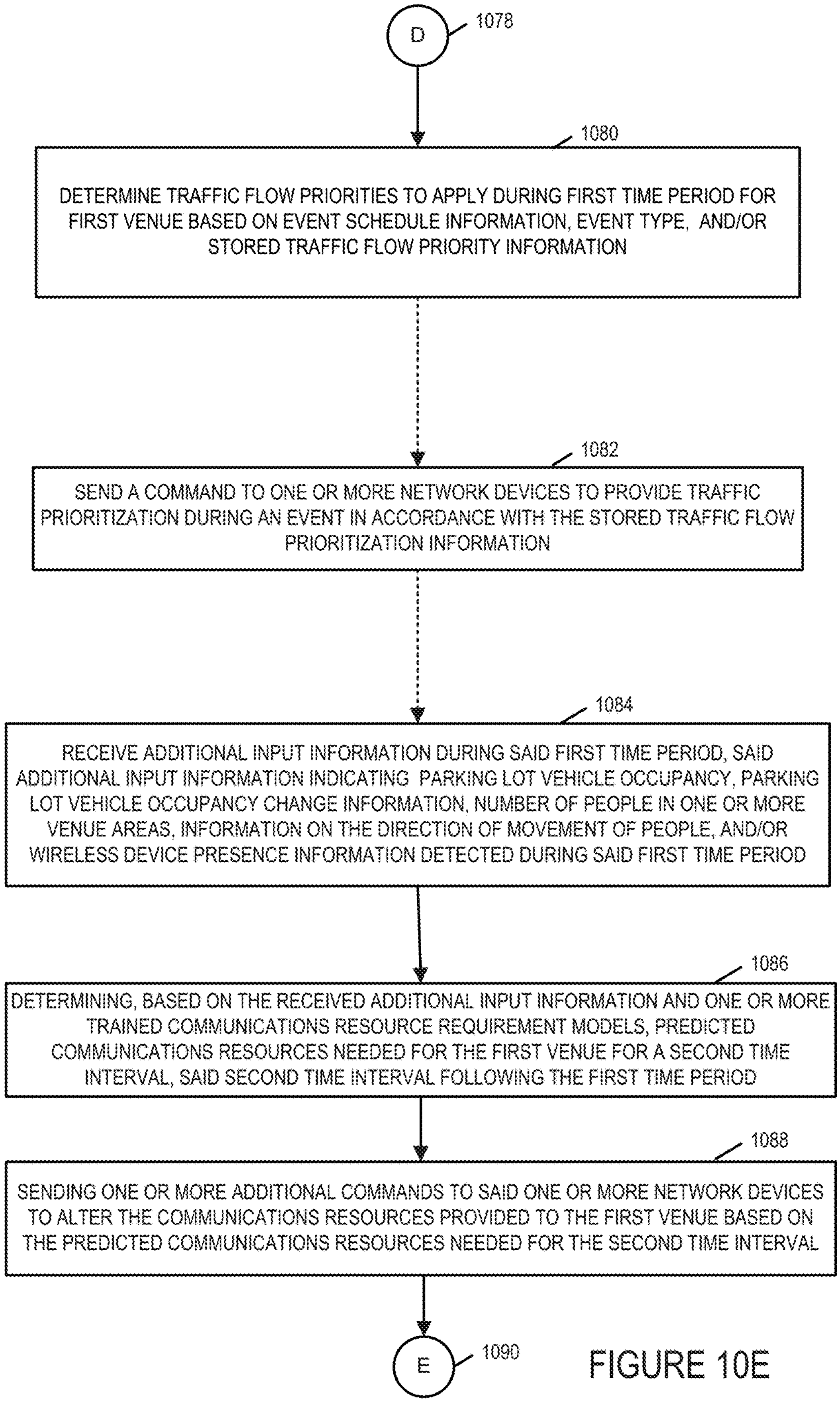
FIG. 10E is a fifth part of a flowchart of an exemplary method of operating a management system in a communications network to manage communications services corresponding to one or more venues including a first venue in accordance with an exemplary embodiment.
Figure 10F:
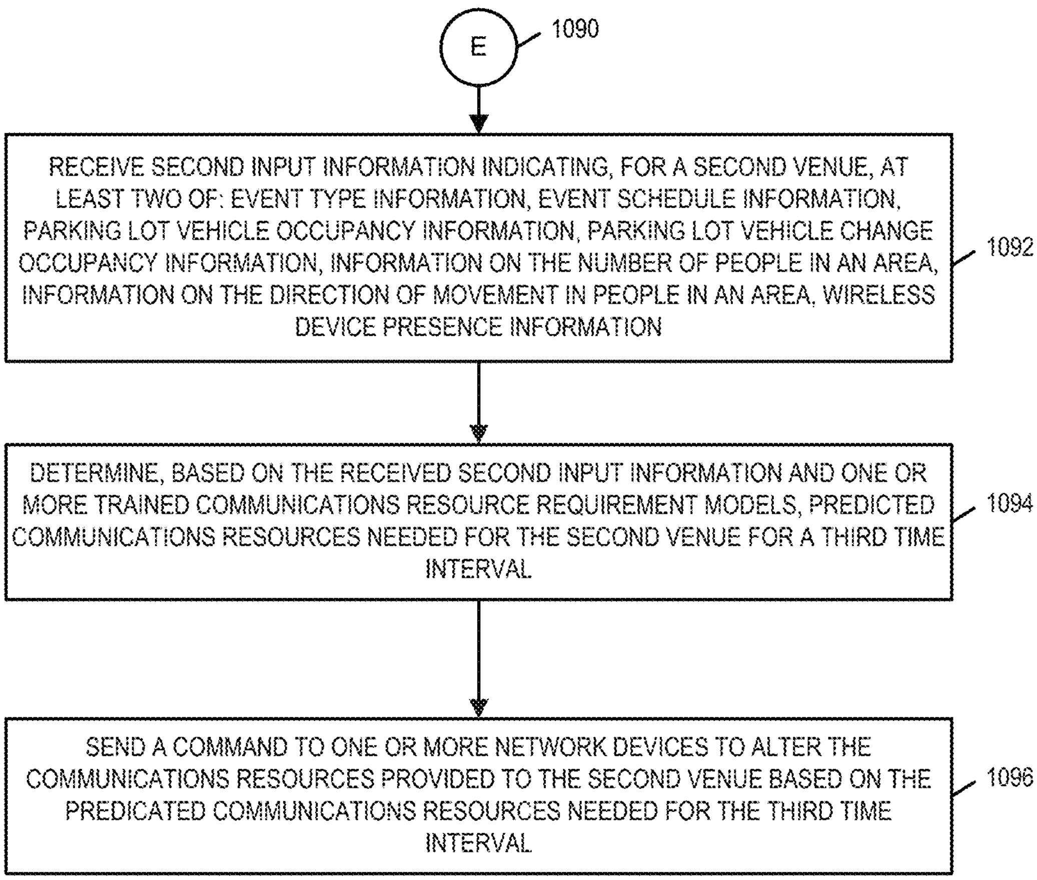
FIG. 10F is a sixth part of a flowchart of an exemplary method of operating a management system in a communications network to manage communications services corresponding to one or more venues including a first venue in accordance with an exemplary embodiment.
Figure 10:
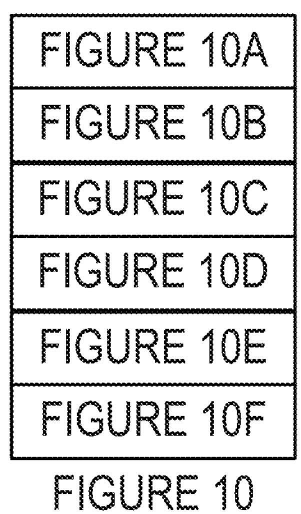
FIG. 10, comprises the combination of FIG. 10A, FIG. 10B, FIG. 10C, FIG. 10D, FIG. 10E and FIG. 10F.

FIG. 10, comprising the combination of FIG. 10A, FIG. 10B, FIG. 10C, FIG. 10D, FIG. 10E and FIG. 10F, is a flowchart 1000 of an exemplary method of operating a management system in a communications network to manage communications services corresponding to one or more venues including a first venue in accordance with an exemplary embodiment. The management system is, e.g., network management system 103 of system 500 of FIGS. 5, 6 and 7. Operation of the exemplary method starts in step 1002 in which the management system is powered on and initialized. Operation proceeds from start step 1002 to step 1004.

In step 1004 the management system collects available input information and actual resource utilization information at one or more venues to use as training data. Step 1004 includes steps 1006, 1008 and 1010. In step 1006 the management system collects venue 1 information for multiple training periods, e.g. corresponding to one or more events. Table 1007 represents venue 1 data collected during multiple training periods (training period 1, training period 2, . . . , training period N). The data collected corresponding to venue 1 includes venue 1 input information (venue 1 training period 1 (V1TP1) input information, venue 1 training period 2 (V1TP2) input information, . . . , venue 1 training period N (V1TPN) input information), and venue 1 communications resource information (communications resources used (CRU) V1TP1, CRUV1TP2, . . . , CRUV1TPN). Exemplary V1TP1 information includes, e.g., information indicating the portion of an event to which the time period corresponds, captured images of venue areas, sensor input, information on number and/or type of parked vehicles, information on number of people in event areas, e.g., inside arena and/or parking areas, direction of motion of people, change in number of vehicles since last training period, number and type of wireless devices detected in various areas of venue, etc. Exemplary CRUV1TP1 includes, e.g., cellular bandwidth used, WiFi bandwidth used, IoT resources used, wired WLAN bandwidth used, on demand resources used, transcoder resources used, firewall resources used, etc.

In step 1008 the management system collects venue 2 information for multiple training periods, e.g. corresponding to one or more events. In step 1010 the management system collects venue Y information for multiple training periods, e.g. corresponding to one or more events. Operation proceeds from step 1004, via connecting node A 1012 to step 1014.

In step 1014 the management system generates one or more communications resource requirement models, e.g. to predict expected resource requirements for one or more venues based on collected training data. Step 1014 includes step 1016 and step 1018.

In step 1016 the management system generates one or more communications resource requirement models for the first venue. Step 1016 includes one or more or all of steps 1022, 1024, 1026, 1028, 1030 and 1032. In step 1022 the management system generates a cellular resource requirement prediction model for venue 1. In step 1024 the management system generates a wired WAN resource prediction model for venue 1. In step 1026 the management system generates an on-demand service predication model for venue 1. In step 1028 the management system generates a firewall resource requirement prediction model for venue 1. In step 1030 the communications system generates a transcoder resource prediction model for venue 1. In step 1032 the management system generates a WiFi resource requirement prediction model for venue 1.

In step 1018 the management system generates one or more communications resource requirement models for the second venue. Step 1018 includes one or more or all of steps 1034, 1036, 1038, 1040, 1042 and 1044. In step 1034 the management system generates a cellular resource requirement prediction model for venue 2. In step 1036 the management system generates a wired WAN resource prediction model for venue 2. In step 1038 the management system generates an on-demand service predication model for venue 3. In step 1040 the management system generates a firewall resource requirement prediction model for venue 2. In step 1042 the communications system generates a transcoder resource prediction model for venue 2. In step 1044 the management system generates a WiFi resource requirement prediction model for venue 1.

In step 1020 the management system generates one or more communications resource requirement models for venue Y. Operation proceeds from step 1014, via connecting node B 1046 to step 1048. In step 1048 the management system stores the communications resource requirement models. Step 1048 includes steps 1050, 1052 and 1054. In step 1050 the management system stores resource requirement models for the first venue. In step 1052 the management system stores resource requirement models for the second venue. In step 1054 the management system stores resource requirement models for the venue Y. Operation proceeds from step 1048 to step 1056.

In step 1056 the management system receives and stores traffic flow prioritization information to apply based on event type, said traffic flow prioritization information indicating for different types of events different data traffic flow priorities. Operation proceeds from step 1056 to step 1058.

In step 1058 the management system receives input for the first venue indicating event type, event schedule, parking lot vehicle occupancy, parking lot occupancy change information, number of people in one or more venue areas, information on the direction of movement of people, and/or wireless device presence information. Operation proceeds from step 1058 to step 1060.

In step 1060 the management system updates one or more communications resource requirement models for the first venue based on the received information corresponding to the first venue. Operation proceeds from step 1060 to step 1062.

In step 1062 the management system determines, based on the received input and one or more resource requirement models, resources predicated to be needed for the first venue at a first time interval, e.g., where the first time interval follows a time interval in which initial model training data is collected. Operation proceeds from step 1062, via connecting node C 1064, to step 1066.

In step 1066 the management system sends a command to one or more network devices to alter the communications resources provided to the first venue based on the communications resources predicted to be needed for the first venue for the first time interval. Step 1066 includes one or more of all of step 1068, 1070, 1072, 1074, 1076 and 1077. In step 1068 the management system sends a command to a cellular network device to alter an amount of cellular bandwidth provided to one or more portions of the first venue. In step 1070 the management system sends a command to a fixed line WAN network device to alter an amount of bandwidth provided to one or more portions of the first venue. In step 1072 the management system sends a command to an on-demand service device, e.g. a VOD server, to alter an amount of on-demand services provided to one or more portions of the first venue. In step 1074 the management system sends a command to firewall service provider device to alter an amount of firewall services provided to one or more portions of the first venue. In step 1076 the management system sends a command to a transcoder service provider to alter an amount of transcoder services provided to one or more portions of the first venue. In step 1077 the management system sends a command to a WiFi network device to alter an amount of WiFi bandwidth provided to one or more portions of the first venue. Operation proceeds from step 1066, via connecting node D 1078 to step 1080.

In step 1080 the management system determines traffic flow priorities to apply during the first time period for the first venue based on event schedule information, event type, and/or stored traffic flow priority information. Operation proceeds from step 1080 to step 1082. In step 1082 the management device sends a command to one or more network devices to provide traffic prioritization during an event in accordance with the stored traffic flow prioritization information and/or determined traffic flow priorities to apply. Operation proceeds from step 1082 to step 1084.

In step 1084 the management system receives additional input information during the first time period, said additional input information indicating parking lot vehicle occupancy, parking lot vehicle occupancy change information, number of people in one or more venue areas, information on the direction of movement of people and/or wireless device presence information detected during the first time period. Operation proceeds from step 1084 to step 1086.

In step 1086 the management system determines, based on the received additional input information and one or more trained communications resource requirement models, predicated communications resources needed for the first venue for a second time interval, said second time interval following the first time period. Operation proceeds from step 1086 to step 1088.

In step 1088 the management system sends one or more additional commands to said one or more network devices to alter the communications resources provided to the first venue based on the predicted communications resources needed for the second time interval. Operation proceeds from step 1088 via connecting node E 1090 to step 1092.

In step 1092 the management system receives second input information indicating for a second venue at least two of: event type information, event schedule information, parking lot vehicle occupancy information, parking lot vehicle change occupancy information, information on the number of people in an area, information on the direction of movement in people in an area, wireless device presence information. Operation proceeds from step 1092 to step 1094.

In step 1094 the management system determines, based on the received second input information and one or more trained communications resource requirement models, predicted communications resources needed for the second venue for a third time interval. Operation proceeds from step 1094 to step 1096.

In step 1096 the management system sends a command to one or more network devices to alter the communications resources provided to the second venue based on the predicated communications resources needed for the third time interval.

Figure 11:
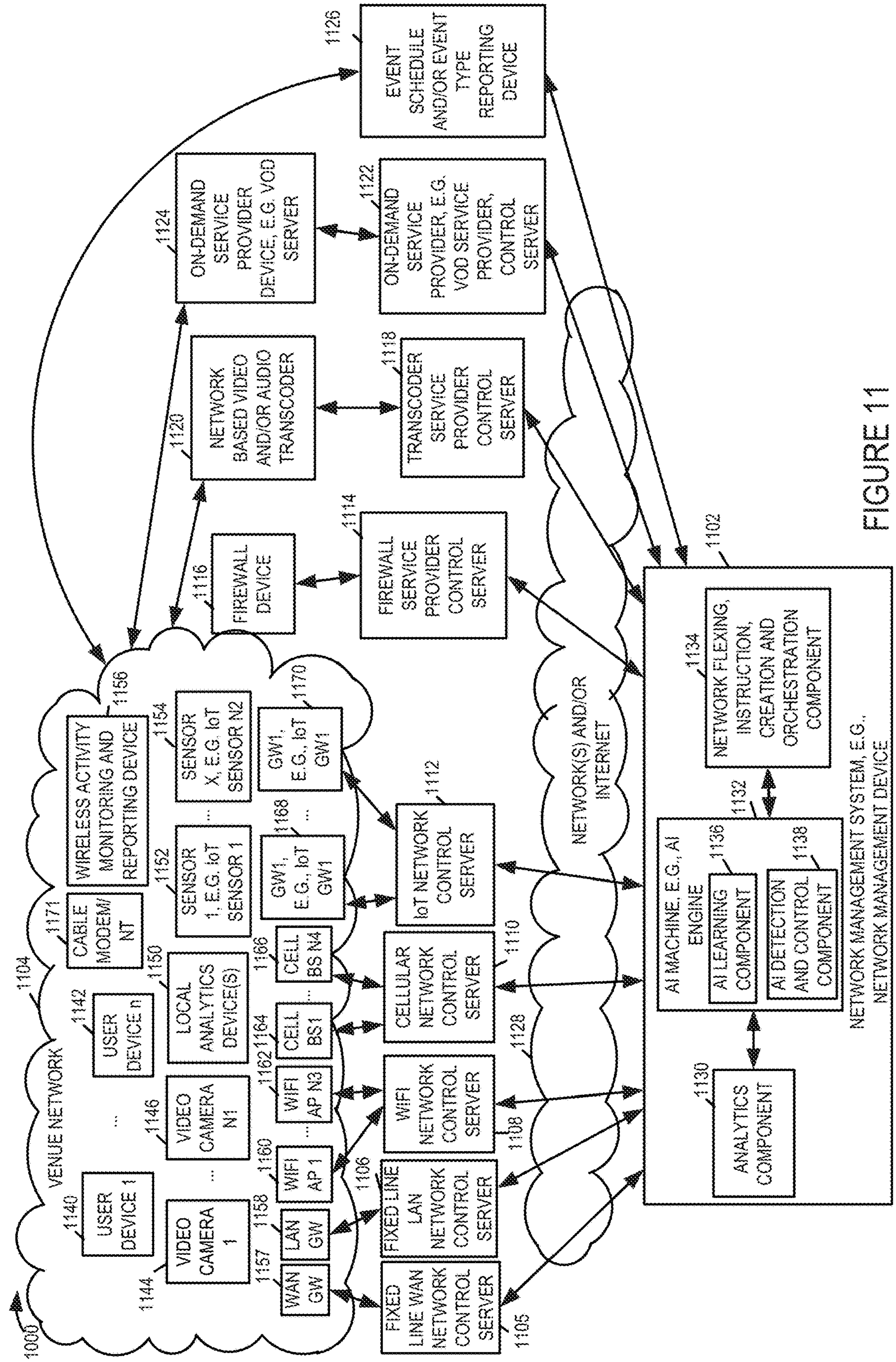
FIG. 11 is a drawing of an exemplary system in accordance with an exemplary embodiment.

FIG. 11 is a drawing of an exemplary system 1100 in accordance with an exemplary embodiment. Exemplary system 1100 includes a network management system 1102, e.g., a network management device, a venue network 1104, a fixed line wide area network control server 1105, a fixed line LAN network control server 1106, a WiFi network control server 1108, a cellular network control server 110, an Internet-of-Things (IoT) network control server 1112, a firewall service provider control server 1114, a firewall device 1116, a transcoder service provider control server 1118, a network based video and/or audio transcoder 1120, an on-demand service provider, e.g., a video on demand (VOD) service provider, control server 1122, an event schedule and/or event type reporting device 1126, and a network and/or the Internet 1128 coupled together. In some embodiment, exemplary system 1100 includes a plurality of venue networks, e.g., corresponding to different sites, e.g. different stadium, arena, etc.

The venue network 1104 includes a plurality of user device (user device 1 1140, . . . , user device n 1142), a plurality of video camera (video camera 1 1144, . . . , video camera N1 1146), one or more local analytics devices 1150, a plurality of sensors (sensor 1 1152, e.g., IoT sensor 1, . . . , sensor N2, e.g., IoT sensor N2), a local area network (LAN) gateway (GW) 1158, a wide area network (WAN) gateway (GW) 1157, a plurality of WiFi access points (WiFi AP 1 1160, . . . , WiFi AP N3 1164), a plurality of cellular base stations (cellular BS 1 1164, . . . , cellular base station N4 1166), a plurality of gateways (GW 1 1168, e.g., IoT GW1, . . . , GW N5 1170, e.g. IoT GW N5), a wireless activity monitoring and reporting device 1156, and a cable modem/network termination (NT) device 1171.

Network management system 1102, e.g. a network management device, includes an analytics component 1130, an AI machine 1132, e.g. an AI engine and a network flexing, instruction, creation, and orchestration component 1134. Examples of exemplary analytics components 1130 includes, e.g., video stream image analysis and characterization component 104 and AI-CNN and deep learning component 106 of FIG. 1, video processing analytics 526, IoT sensor data aggregation and processing analytics 530 and network analytics 532 of FIG. 5, and cloud video analytics 858 of FIG. 8. AI machine 1132 is, e.g. AI machine 116 of FIGS. 1, 5 and 8. AI machine 1132 includes an AI learning component 1136 and an AI detection and control component 1138. Network flexing, instruction, creation and orchestration system 1134 is, e.g. network flexing, instruction, creation and orchestration system 121 of FIGS. 1, 5, and 8. The network management system 1102 manages the venue network and services and/or resources provided to the users of the venue network.

Figure 12:
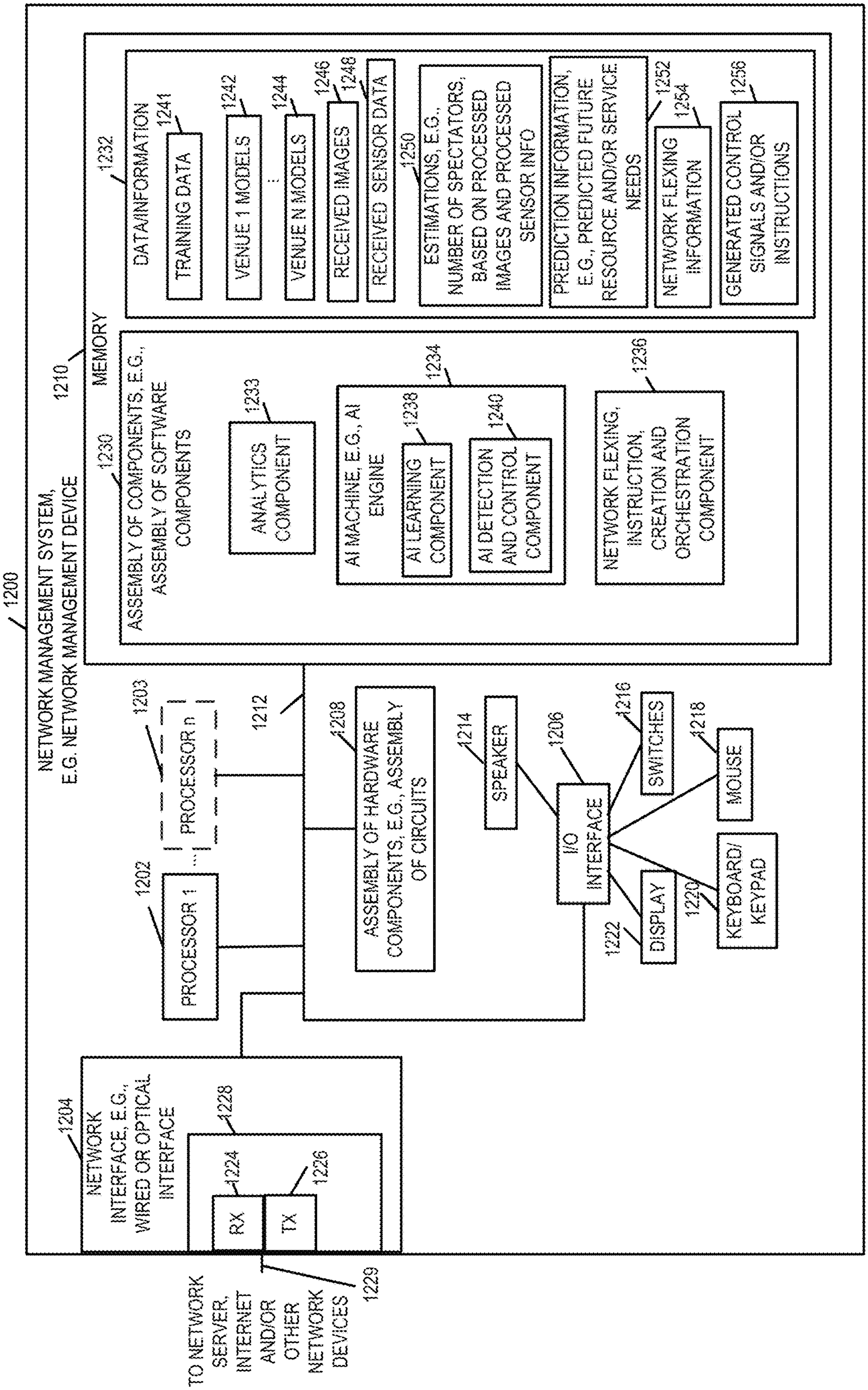
FIG. 12 is a drawing of an exemplary network management system, e.g., a network management device, in accordance with an exemplary embodiment.

FIG. 12 is a drawing of an exemplary network management system 1200, e.g., a network management device, in accordance with an exemplary embodiment. Network management system 1200 is, e.g., network management system 103 of FIGS. 1-2, 5-7, a network management system including AI engine 116 and network flexing instruction, creation and orchestration system 121 and optionally cloud video analytics 858 of FIG. 8, a network management system implementing the method of flowchart 1000 of FIG. 10, and/or network management system 1102 of FIG. 11.

Network management system 1200 includes one or more processors, e.g., CPUs, (processor 1 1202, . . . , processor n 1203), a network interface 1204, e.g., a wired or optical interface, an I/O interface 1206, an assembly of hardware components 1208, e.g., assembly of circuits, and memory 1210 coupled together via a bus 1212 over which the various elements may interchange data and information. Network management system 1200 further includes a plurality of input/output devices (speaker 1214, switches 1216, mouse 1218, keyboard/keypad 1220, and display 1222, e.g., a touch screen display, coupled to I/O interface 1206 via which the various elements (1214, 1216, 1218, 1220, 1222) are coupled to bus 1212 and to other elements within system 1200.

Network interface 1204 includes a receiver (RX) and a transmitter 1220 via which the network management system may receive and sends signals, via cable or fiber connection 1229, to network servers, the Internet, and/or other network devices, e.g. for controlling and management one or more networks, e.g. venue networks. In some embodiments, receiver 1224 and transmitter 1226 are part of a transceiver 1228.

Memory 1210 includes an assembly of components 1230, e.g., an assembly of software components, e.g. routines, modules, applications, etc., and data/information 1232. Assembly of components 1230 includes an analytics component 1233, an artificial intelligence (AI) machine 1234, e.g., an AI engine, and a network flexing, instruction and creation, and orchestration component 1236. AI machine 1234 includes an AI learning component 1238 and an AI detection and control component 1236.

Data/information 1232 includes training data 1241, a plurality of venue models (venue 1 models 1242, . . . , venue N models 1244), received images 1246, received sensor data 1248, estimations 1250, e.g. estimated number of spectators based on processed images and processed sensor information, estimated direction of spectator flow, etc., prediction information 1252, e . . . g, predicted future resource and/or services needs corresponding to different portions of the venue area based on estimated information, network flexing information, e.g., determined changed to made to the system, e.g. changes in capacity, changes in bandwidth, changes in services offered, etc., based on the prediction information, and generated control signals and/or instruction 1256, e.g. to be sent to devices in the venue network, to devices controlling devices in the venue network, and/or to other devices, e.g., 3rd party devices, offering services to devices in the venue network.

NUMBERED LIST OF EXEMPLARY METHOD EMBODIMENTS

Method Embodiment 1 A method of operating a management system in a communications network to manage communications services corresponding to a first venue, the method comprising: receiving (1058) input information indicating, for the first venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, vans, SUVs, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determining (1062), based on the received input information and one or more trained communications resource requirement models, predicted communications resources predicted to be needed for the first venue for a first time interval; and sending (1066) a command to one or more network devices to alter the communications resources provided to the first the first venue based on the predicted communicates resources needed for the first time interval.

Method Embodiment 2 The method of Method Embodiment 1, wherein said first time interval is a future time interval in which communications resource needs for the first time interval may differ from the communications resource needs for a current time interval in which the determination of the predicted communications resources needed for the first venue for a first time interval is made.

Method Embodiment 1A The method of Method Embodiment 1 wherein the venue is an event venue, said event venue being one of a sports stadium complex (e.g., including a stadium and parking facility), a concert venue (which includes parking), a theme park, a museum, or an expedition hall.

Method Embodiment 3 The method of Method Embodiment 1, further comprising: storing (1050) a plurality of different resource prediction models for the first venue, different resource prediction modules corresponding to different resources available for use by communications devices at said first venue.

Method Embodiment 4 The method of Method Embodiment 3, wherein the plurality of different resource prediction models for the first venue include a cellular bandwidth prediction model.

Method Embodiment 4AA The method of Method Embodiment 4, wherein sending (1066) a command to one or more network devices to alter the communications resources provided to the first the first venue based on the predicted communicates resources needed for the first time interval includes: sending (1068) a command to a cellular network device (e.g., cellular base station or cellular network controller) to alter (e.g., increase or decreased based on the predicted need for cellular services) the amount of cellular bandwidth provided to one or more portions of the first venue.

Method Embodiment 4A The method of Method Embodiment 4, wherein the plurality of different resource prediction models for the first venue further includes a fixed line WAN (wide area network) bandwidth prediction model.

Method Embodiment 4AAA The method of Method Embodiment 4A, wherein sending (1066) a command to one or more network devices to alter the communications resources provided to the first the first venue based on the predicted communicates resources needed for the first time interval includes: sending (1070) a command to a fixed line WAN network device (e.g., FIOS or cable device such as a network termination device at the first venue) to alter (e.g., increase or decreased based on the predicted need for fixed line WAN services) an amount of fixed line WAN bandwidth provided to one or more portions of the first venue.

Method Embodiment 4B The method of Method Embodiment 4A, wherein the wherein the plurality of different resource prediction models for the first venue further includes an on-demand service (e.g., video streaming service) prediction model.

Method Embodiment 4BA The method of Method Embodiment 4B, wherein sending (1066) a command to one or more network devices to alter the communications resources provided to the first the first venue based on the predicted communicates resources needed for the first time interval includes: sending (1072) a command to an on demand service provider device (e.g., VOD server) to alter (e.g., increase or decreased based on the predicted need for on demand services) an amount of on-demand services (e.g., number individual on demand content streams which can be simultaneously be streamed to devices at the venue) provided to one or more portions of the first venue.

Method Embodiment 5 The method of Method Embodiment 4, wherein the plurality of different resource prediction models for the first venue further includes a firewall resource prediction model.

Method Embodiment 5A The method of Method Embodiment 5, wherein sending (1066) a command to one or more network devices to alter the communications resources provided to the first the first venue based on the predicted communicates resources needed for the first time interval includes: sending (1074) a command to a firewall service provider to alter the number of devices at said venue for which firewall services are provided.

Method Embodiment 6 The method of Method Embodiment 5, wherein the plurality of different resource prediction models for the first venue further includes a transcoder resource (e.g., an audio and/or video transcoder resource) prediction model.

Method Embodiment 7 The method of Method Embodiment 6, wherein sending (1066) a command to one or more network devices to alter the communications resources provided to the first the first venue based on the predicted communicates resources needed for the first time interval includes: sending (1076)) a command to a transcoder service provider device (e.g., server that performs video and/or audio transcoding as part of a communications service) to alter (e.g., increase or decrease based on the predicted need for on transcoder services) the amount of transcoder services (e.g., number individual audio and/or video content streams which can be simultaneously transcoded) for devices located at one or more portions of the first venue.

Method Embodiment 8 The method of Method Embodiment 1, further comprising storing (1056) event type traffic flow prioritization information, said event traffic prioritization information indicating for different types of events, different data traffic flow priorities.

Method Embodiment 9 The method of Method Embodiment 8 further comprising: sending (1088) a command to one or more network devices (wireless or fixed WAN devices such as base stations, access points, or termination devices) to provide traffic prioritization during an event in accordance with the prioritization information corresponding to the type of event which is occurring.

Method Embodiment 9A The method of Method Embodiment 9, wherein said traffic flow prioritization information includes video data prioritization for video traffic during concerts giving video traffic higher priority during a concert than is provided at times a concert is not ongoing.

Method Embodiment 9B The method of Method Embodiment 9, wherein said traffic flow prioritization information includes text data prioritization for traffic corresponding to text messages during sports games, said text data prioritization giving text message higher priority during sports games than during other events, said text traffic being treated as best effort traffic during other events and being treated as high priority traffic during sports games.

Method Embodiment 10 The method of Method Embodiment 1, further comprising: receiving (1084) additional input information received during said first time period, said additional information indicating, for the first venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, vans, SUVs, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determining (1086), based on the received additional input information and one or more trained communications resource requirements models, predicted communications resources needed for the first venue for a second time interval, said second time period following said first time period; and sending (1088) one or more additional commands to said one or more network devices to alter the communications resources provided to the first venue based on the predicted communications resources needed for the second time interval.

Method Embodiment 11 The method of Method Embodiment 10, wherein said second time interval follows said first time interval and is a time interval while said event is ongoing, said one or more additional commands dynamically changing the communications resources provided to said venue while an event is ongoing based on information collected during said event (e.g., real time updates of the predictions of communications needs are made and the available resources are dynamically changed in accordance with the real time prediction updates).

Method Embodiment 12 The method of Method Embodiment 1, further comprising: generating (1014) said one or more communications resource requirement models based model training information collected at said first venue over several periods of time and actual communications resources required at said first venue.

Method Embodiment 12A The method of Method Embodiment 12, wherein generating (1014) said one or more communications resource requirement models includes using the actual communications resources required at said venue following a training information collection time period as a known resource requirement corresponding to the preceding time period for which information was collected (e.g., actual resources which were required following training time period TTP2 are used as the predicted output during training given the input information collected in TTP1 immediately preceding the time period for which the resource prediction is made thus for a known training set of input information the actual resources required in the following time period are used as the known output during training since they represent the actual resources which were required following a known set of input information).

Method Embodiment 13 The method of Method Embodiment 12, further comprising: updating (1060) said one or more trained communications resource requirement models based on information collected during said first event.

Method Embodiment 14 The method of Method Embodiment 12, further comprising: storing (1048) different sets of communications resource requirement models for a plurality of different venues, said first venue being one of said plurality of different venues, said one or more trained communications resource requirement models being a first set of resource requirement models corresponding to said first venue.

Method Embodiment 15 The method of Method Embodiment 14, further comprising: receiving (1092) second input information indicating, for a second venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determining (1094), based on the received second input information and one or more trained communications resource requirement models, predicted communications resources needed for the second venue for a third time interval (e.g., a time interval which is the same or different from the first or second time interval); and sending (1096) a command to one or more network devices to alter the communications resources provided to the second venue based on the predicted communications resources needed for the third time interval.

Method Embodiment 16 The method of Method Embodiment 1, wherein the management system includes an artificial intelligence (AI) machine (116) (e.g., AI engine) including an AI learning component (117) and an AI detection and control component (119).

Method Embodiment 17 The method of Method Embodiment 16, wherein the management system further includes a network flexing, instruction, creation and orchestration system (121), coupled to said AI machine.

Method Embodiment 18 The method of Method Embodiment 1, wherein said management system is a cloud based management system.

NUMBERED LIST OF EXEMPLARY SYSTEM EMBODIMENTS

System Embodiment 1 A management system (103 or 1102 or 1200) in a communications network (500 or 1100), said management system configured to manage communications services corresponding to a first venue, the management system (103 or 1102 or 1200) comprising: a receiver (1224); a transmitter (1226); and a processor (1202) configured to: operate the receiver (1224) to receive (1058) input information indicating, for the first venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, vans, SUVs, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determine (1062), based on the received input information and one or more trained communications resource requirement models, predicted communications resources predicted to be needed for the first venue for a first time interval; and operate the transmitter (1226) to send (1066) a command to one or more network devices to alter the communications resources provided to the first the first venue based on the predicted communicates resources needed for the first time interval.

System Embodiment 2 The management system (103 or 1102 or 1200) of System Embodiment 1, wherein said first time interval is a future time interval in which communications resource needs for the first time interval may differ from the communications resource needs for a current time interval in which the determination of the predicted communications resources needed for the first venue for a first time interval is made.

System Embodiment 1A The management system (103 or 1102 or 1200) of System Embodiment 1 wherein the venue is an event venue, said event venue being one of a sports stadium complex (e.g., including a stadium and parking facility), a concert venue (which includes parking), a theme park, a museum, or an expedition hall.

System Embodiment 3 The management system (103 or 1102 or 1200) of System Embodiment 1, further comprising: memory (1210); and wherein said processor (1202) is further configured to: store (1050) a plurality of different resource prediction models for the first venue in said memory, different resource prediction modules corresponding to different resources available for use by communications devices at said first venue.

System Embodiment 4 The management system (103 or 1102 or 1200) of System Embodiment 3, wherein the plurality of different resource prediction models for the first venue include a cellular bandwidth prediction model.

System Embodiment 4AA The management system (103 or 1102 or 1200) of System Embodiment 4, wherein said processor (1202) is configured to: operate the transmitter to send (1068) a command to a cellular network device (e.g., cellular base station (1164, 1166) or cellular network controller (1110)) to alter (e.g., increase or decreased based on the predicted need for cellular services) the amount of cellular bandwidth provided to one or more portions of the first venue, as part of being configured to operate the transmitter to send (1066) a command to one or more network devices to alter the communications resources provided to the first the first venue based on the predicted communicates resources needed for the first time interval includes:

System Embodiment 4A The management system (103 or 1102 or 1200) of System Embodiment 4, wherein the plurality of different resource prediction models for the first venue further includes a fixed line WAN (wide area network) bandwidth prediction model.

System Embodiment 4AAA The management system (103 or 1102 or 1200) of System Embodiment 4A, wherein said processor (1202) is configured to: operate the transmitter (1226) to send (1070) a command to a fixed line WAN network device (e.g., FIOS or cable device such as a cable modem or network termination device (1171) at the first venue) to alter (e.g., increase or decreased based on the predicted need for fixed line WAN services) an amount of fixed line WAN bandwidth provided to one or more portions of the first venue, as part of operating being configured to operate the transmitter to send (1066) a command to one or more network devices to alter the communications resources provided to the first the first venue based on the predicted communicates resources needed for the first time interval.

System Embodiment 4B The management system (103 or 1102 or 1200) of System Embodiment 4A, wherein the wherein the plurality of different resource prediction models for the first venue further includes an on-demand service (e.g., video streaming service) prediction model.

System Embodiment 4BA The management system (103 or 1102 or 1200) of System Embodiment 4B, wherein said processor (1202) is configured to: operate the transmitter (1226) to send (1072) a command to an on demand service provider device (e.g., controller (1122) for VOD server or VOD server (1124)) to alter (e.g., increase or decreased based on the predicted need for on demand services) an amount of on-demand services (e.g., number individual on demand content streams which can be simultaneously be streamed to devices at the venue) provided to one or more portions of the first venue, as part of being configured to send (1066) a command to one or more network devices to alter the communications resources provided to the first the first venue based on the predicted communicates resources needed for the first time interval.

System Embodiment 5 The management system (103 or 1102 or 1200) of System Embodiment 4, wherein the plurality of different resource prediction models for the first venue further includes a firewall resource prediction model.

System Embodiment 5A The management system (103 or 1102 or 1200) of System Embodiment 5, wherein said processor (1202) is configured to: operate the transmitter (1226) to send (1074) a command to a firewall service provider (e.g., to firewall service provider control server 1114 or firewall device 1116) to alter the number of devices at said venue for which firewall services are provided, as part of being configured to operate the transmitter (1226) to send (1066) a command to one or more network devices to alter the communications resources provided to the first the first venue based on the predicted communicates resources needed for the first time interval.

System Embodiment 6 The management system (103 or 1102 or 1200) of System Embodiment 5, wherein the plurality of different resource prediction models for the first venue further includes a transcoder resource (e.g., an audio and/or video transcoder resource) prediction model.

System Embodiment 7 The management system (103 or 1102 or 1200) of System Embodiment 6, wherein said processor (1202) is configured to: operate the transmitter (1226) to send (1076)) a command to a transcoder service provider device (e.g., control server for a transcoder 1118 or device, e.g. server, 1120 that performs video and/or audio transcoding as part of a communications service) to alter (e.g., increase or decrease based on the predicted need for on transcoder services) the amount of transcoder services (e.g., number individual audio and/or video content streams which can be simultaneously transcoded) for devices located at one or more portions of the first venue, as part of being configured to operate said transmitter (1226) to send (1066) a command to one or more network devices to alter the communications resources provided to the first the first venue based on the predicted communicates resources needed for the first time interval.

System Embodiment 8 The management system (103 or 1102 or 1200) of System Embodiment 1, wherein said processor (1202) is further configured to: store (1056) event type traffic flow prioritization information (e.g., in said memory (1210)), said event traffic prioritization information indicating for different types of events, different data traffic flow priorities.

System Embodiment 9 The management system (103 or 1102 or 1200) of System Embodiment 8 wherein said processor (1202) is further configured to: operate the transmitter (1226) to send (1088) a command to one or more network devices (wireless or fixed WAN devices such as base stations (1164, 1166), access points (1160, 1162) or termination devices) to provide traffic prioritization during an event in accordance with the prioritization information corresponding to the type of event which is occurring.

System Embodiment 9A The management system (103 or 1102 or 1200) of System Embodiment 9, wherein said traffic flow prioritization information includes video data prioritization for video traffic during concerts giving video traffic higher priority during a concert than is provided at times a concert is not ongoing.

System Embodiment 9B The management system (103 or 1102 or 1200) of System Embodiment 9, wherein said traffic flow prioritization information includes text data prioritization for traffic corresponding to text messages during sports games, said text data prioritization giving text message higher priority during sports games than during other events, said text traffic being treated as best effort traffic during other events and being treated as high priority traffic during sports games.

System Embodiment 10 The management system (103 or 1102 or 1200) of System Embodiment 1, wherein said processor (1202) is further configured to: operate said receiver (1224) to receive (1084) additional input information received during said first time period, said additional information indicating, for the first venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, vans, SUVs, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determine (1086), based on the received additional input information and one or more trained communications resource requirements models, predicted communications resources needed for the first venue for a second time interval, said second time period following said first time period; and operate the transmitter (1226) to send (1088) one or more additional commands to said one or more network devices to alter the communications resources provided to the first venue based on the predicted communications resources needed for the second time interval.

System Embodiment 11 The management system (103 or 1102 or 1200) of System Embodiment 10, wherein said second time interval follows said first time interval and is a time interval while said event is ongoing, said one or more additional commands dynamically changing the communications resources provided to said venue while an event is ongoing based on information collected during said event (e.g., real time updates of the predictions of communications needs are made and the available resources are dynamically changed in accordance with the real time prediction updates).

System Embodiment 12 The management system (103 or 1102 or 1200) of System Embodiment 1, wherein said processor (1202) is further configured to: generate (1014) said one or more communications resource requirement models based model training information collected at said first venue over several periods of time and actual communications resources required at said first venue.

System Embodiment 12A The management system (103 or 1102 or 1200) of System Embodiment 12, wherein said processor (1202) is further configured to: use the actual amount of communications resources required at said venue following a training information collection time period as a known resource requirement corresponding to the training information collection time period (e.g., actual resources which were required following training time period TTP1 are used as the predicted output during training given the input information collected in TTP1), as part of being configured to generate (1014) said one or more communications resource requirement models.

System Embodiment 13 The management system (103 or 1102 or 1200) of System Embodiment 12, further wherein said processor (1202) is further configured to: update (1060) said one or more trained communications resource requirement models based on information collected during said first event.

System Embodiment 14 The management system (103 or 1102 or 1200) of System Embodiment 12, wherein said processor (1202) is further configured to: store (1048) different sets of communications resource requirement models for a plurality of different venues, said first venue being one of said plurality of different venues, said one or more trained communications resource requirement models being a first set of resource requirement models corresponding to said first venue.

System Embodiment 15 The management system (103 or 1102 or 1200) of System Embodiment 14, wherein said processor (1202) is further configured to: operate said receiver (1224) to receive (1092) second input information indicating, for a second venue, at least two of: event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices (1140, 1142)); determine (1094), based on the received second input information and one or more trained communications resource requirement models, predicted communications resources needed for the second venue for a third time interval (e.g., a time interval which is the same or different from the first or second time interval); and operate said transmitter (1226) to send (1096) a command to one or more network devices to alter the communications resources provided to the second venue based on the predicted communications resources needed for the third time interval.

System Embodiment 16 The management system (103 or 1102 or 1200) of System Embodiment 1, wherein the management system (103 or 1102 or 1200) includes an artificial intelligence (AI) machine (116 or 1132 or 1234) (e.g., AI engine) including an AI learning component (117 or 1136 or 1238) and an AI detection and control component (119 or 1138 or 1240).

System Embodiment 17 The management system (103 or 1102 or 1200) of System Embodiment 16, wherein the management system (103 or 1102 or 1200) further includes a network flexing, instruction, creation and orchestration system (121 or 1134 or 1236), coupled to said AI machine (116 or 1132 or 1234).

System Embodiment 18 The management system (103 or 1102 or 1200) of System Embodiment 1, wherein said management system (103 or 1102 or 1200) is a cloud based management system.

NUMBERED LIST OF EXEMPLARY COMPUTER READABLE MEDIUM EMBODIMENTS

Computer Readable Medium Embodiments 1 A non-transitory computer readable medium (1210) including computer executable instructions which when executed by a processor (1202) included in a management system (1102 or 1200) in a communications network (1100) control the management system (1102 or 1200) to perform the steps of: receiving (1058) input information indicating, for a first venue, at least two of:

event type information (e.g., concert, sports event (baseball game, football game, soccer game or some other type of sporting event)), event schedule information (e.g. start and/or end time, time of intermission, end of innings as they occur), parking lot vehicle occupancy information (e.g. number and type of parked vehicles such as cars, vans, SUVs, trucks and buses), parking lot vehicle occupancy change information, information on the number of people in an area, information on the direction of movement in people in an area (e.g., leaving area and entering a particular adjacent area such as parking lot to stadium or going the other way from the stadium to the parking lot), wireless device presence information (e.g., number and/or type of detected wireless communications devices, e.g., cell phones, lap tops, pad devices); determining (1062), based on the received input information and one or more trained communications resource requirement models, predicted communications resources predicted to be needed for the first venue for a first time interval; and sending (1066) a command to one or more network devices to alter the communications resources provided to the first the first venue based on the predicted communicates resources needed for the first time interval.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g. a control server such as application server (AS), a network server, a gateway such as an IoT gateway, an End Point (EP) device such as EP IoT device, e.g. EP IoT sensor or application device, a user device such as a user equipment (UE) device, base stations, e.g. cellular base station supporting NB-IoT (macro cell base station or small cell base station) such as a eNB or gNB or ng-cNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a control server such as application server (AS), network server, gateway such as an IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a control server such as application server (AS), network server, gateway such as IoT gateway, End Point (EP) device such as EP IoT device, e.g. EP IoT sensor or application device, user device such as a user equipment (UE) device, base stations, e.g. cellular base station supporting NB-IoT (macro cell base station or small cell base station) such as a cNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as control server such as an application server (AS), network server, gateway such as IoT gateway, End Point (EP) device such as EP IoT device, e.g. EP IoT sensor or application device 3, user device such as a user equipment (UE) device, base stations, e.g. cellular base station supporting NB-IoT (macro cell base station or small cell base station) such as a cNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a management system in a communications network to manage communications services corresponding to a first venue, the method comprising:

storing event type traffic flow prioritization information in a storage device, said event type traffic flow prioritization information indicating, for different types of events, different data traffic flow priorities;

receiving input information corresponding to the first venue indicating, for the first venue, at least event type information and event schedule information; and sending a command to one or more network devices to provide traffic prioritization during a first event in accordance with the event type traffic flow prioritization information and the event type information.

2. The method of claim 1, wherein said event type traffic flow prioritization information includes text data prioritization information for traffic flows corresponding to text messages during sports games.

3. The method of claim 2, wherein said text data prioritization information gives text messages higher priority during sports games than during other events, text traffic flows being treated as best effort traffic flows during other events and being treated as high priority traffic flows during sports games.

4. The method of claim 3, wherein said received input information includes information indicating the first event is a concert.

5. The method of claim 1, wherein said event type traffic flow prioritization information includes video data prioritization for video traffic flows during concerts giving video traffic higher priority during a concert than is provided at another time when a concert is not ongoing.

6. The method of claim 1, further comprising:

storing a plurality of different resource prediction models for the first venue, different resource prediction models corresponding to different resources available for use by communications devices at said first venue.

7. The method of claim 6, wherein the plurality of different resource prediction models for the first venue includes a cellular bandwidth prediction model.

8. The method of claim 7, wherein the plurality of different resource prediction models for the first venue further includes a firewall resource prediction model.

9. The method of claim 8, wherein the plurality of different resource prediction models for the first venue further includes a transcoder resource prediction model.

10. The method of claim 6, further comprising:

sending a command to a transcoder service provider device to alter the amount of transcoder services for devices located at one or more portions of the first venue.

11. The method of claim 1, further comprising:

receiving additional input information, said additional input information indicating, for the first venue, at least two different types of information, said two different types of information being from the following possible information: vehicle occupancy information, parking lot vehicle occupancy change information, information on the number of people in an area, or information on the direction of movement in people in an area;

determining, based on the received additional input information and one or more trained communications resource requirements models, predicted communications resources needed for the first venue for a second time interval which follows a first time interval which occurs during a first portion of said first event; and sending one or more additional commands to said one or more network devices to alter the communications resources provided to the first venue based on the predicted communications resources needed for the second time interval.

12. The method of claim 11, wherein said one or more additional commands dynamically changes the communications resources provided to said first venue.

13. The method of claim 11, further comprising:

generating said one or more trained communications resource requirement models based on model training information collected at said first venue over several periods of time and actual communications resources required at said first venue.

14. The method of claim 13, further comprising:

storing different sets of communications resource requirement models for a plurality of different venues, said first venue being one of said plurality of different venues, said one or more trained communications resource requirement models being a first set of resource requirement models corresponding to said first venue.

15. A management system in a communications network, said management system configured to manage communications services corresponding to a first venue, the management system comprising:

a storage device including stored event type traffic flow prioritization information, said event type traffic flow prioritization information indicating, for different types of events, different data traffic flow priorities;

a receiver;

a transmitter; and a processor configured to:

control the management system to store event type traffic flow prioritization information in the storage device, said event type traffic flow prioritization information indicating, for different types of events, different data traffic flow priorities;

operate the receiver to receive input information corresponding to the first venue indicating, for the first venue, at least event type information and event schedule information; and control the transmitter to send a command to one or more network devices to provide traffic prioritization during a first event in accordance with the event type traffic flow prioritization information and the event type information.

16. The management system of claim 15, wherein said event type traffic flow prioritization information includes text data prioritization information for traffic flows corresponding to text messages during sports games.

17. The management system of claim 16, wherein said text data prioritization information gives text messages higher priority during sports games than during other events, text traffic flows being treated as best effort traffic flows during other events and being treated as high priority traffic flows during sports games.

18. The management system of claim 15, wherein said event type traffic flow prioritization information includes video data prioritization information for video traffic flows during concerts giving video traffic higher priority during a concert than is provided at another time when a concert is not ongoing.

19. The management system of claim 18, wherein said input information includes information indicating that the first event is a concert.

20. The management system of claim 15, wherein the processor is further configured to control the management system to:

store a plurality of different resource prediction models for the first venue, different resource prediction models corresponding to different resources available for use by communications devices at said first venue.

* * * * *